United States Patent [19]

Kimura et al.

[11] Patent Number: 6,089,327
[45] Date of Patent: Jul. 18, 2000

[54] BOTTOM CULTIVATING MACHINE AND FIELD CULTIVATING MACHINE FOR FORMING SOIL LAYER HAVING UNIFORM FIELD

[75] Inventors: Shigetoshi Kimura; Tsuyoshi Shimomura, both of Ibaraki-ken; Toyokazu Nakayama, Tsuchiura, all of Japan

[73] Assignee: Sugano Farm Machinery Mfg. Co., Ltd., Sarachi-gun, Japan

[21] Appl. No.: 08/759,597

[22] Filed: Dec. 5, 1996

[51] Int. Cl.[7] ........................................................ E02F 1/00
[52] U.S. Cl. ................................ 172/4.5; 172/239; 701/50
[58] Field of Search ............................... 701/50; 172/239, 172/2, 4, 4.5, 7, 11, 12

[56] References Cited

U.S. PATENT DOCUMENTS 5,005,652  4/1991  Johnson .................................... 172/2 X
5,110,202  5/1992  Dornbusch et al. ................. 172/4.5 X

*Primary Examiner*—Christopher J. Novosad
*Attorney, Agent, or Firm*—Kaneska & Takeuchi

[57] ABSTRACT

A bottom cultivating machine including a laser emitter for emitting a plane signal of a laser beam, a laser detector which is secured to a frame and detects the plane signal to output an attitude control signal, a horizontal detector having a horizontal sensor which is secured to the frame and serves to detect the level of the front end portion of the bottom cultivating machine in a cultivation progress direction, and a controller for controlling the height of the bottom cultivating machine on the basis of the attitude control signal and controlling the attitude of the bottom cultivating machine on the basis of a signal output from the horizontal sensor by upwardly or downwardly moving a gage wheel or a heel which is provided at the rear portion of the bottom cultivating machine.

13 Claims, 32 Drawing Sheets

FIXING POINT AT UPPER LINK TRACTOR SIDE

MODIFICATION OF MOUNT POINT OF UPPER LINK

MODIFICATION OF UPPER LINK ITSELF

BOTTOM CULTIVATING MACHINE AND FIELD CULTIVATING MACHINE FOR FORMING SOIL LAYER HAVING UNIFORM FIELD

THE BACKGROUND OF INVENTION

1. Field of the Invention

The present invention relates to a bottom cultivating machine for forming a soil layer having an uniform field, and a cultivating machine for forming leveled field surface, flat ditches, etc., and more particularly to a field cultivating machine which is suitably applied to a plowing work for turning of soil layer in which a soil pan is leveled and an uniform soil layer is formed on the basis of the leveled soil pan, and which can form not only a flat field surface, but also a flat drainage, a flat ditch, etc. in parallel to and along the reference plane.

2. Description of the Related Art

In order to effectively use a field, it is important to make the soil environment uniform over the overall field. For this purpose, it has been hitherto considered to merely level the surface of the soil, and no attention has been paid to the inside of the soil. It is most important to flatten not only the surface of the soil, but also the soil pad of the field, particularly to make a soil layer flat and uniform.

In Japan, the rotation of crops between a paddy field and a farm land was previously carried out as a typical manner of effectively using the field. The cultivation of wheat as a secondary crop was degenerated because it was unprofitable in terms of the price competition. The rotation of crops was a method of activating the soil, and thus a new method for the management of fields which can take the same role as the rotation of crops has been required.

The rotation of crops has various advantages: (1) the crops can be stably harvested in high yield; (2) the problem of the repeated cultivation in a farm land can be avoided; (3) the paddy crop in the farm land is high; and (4) the harvest of crops such as soybeans, etc. is high.

However, the rotation of crops has disadvantages: (1) drainage is excessive or bad; (2) manganese is excessively contained in a rotated farm land; (3) there is sterility problem in a paddy field which is rotated from a farm land; and (4) the growth of crops is disturbed due to occurrence of blight in a rotated farm land.

As described above, the rotation of crops between the paddy field and the farm land has the advantages and the disadvantages, however, it is the very reasonable mode of using fields in consideration of various characteristics of the paddy field and the farm land.

A described above, the rotation of crops is suitable for Japanese agriculture. For the rotation of crops as described above or the conversion of paddy fields to farm lands to reduce surplus paddy fields, it is important not only to keep the soil of fields fertile, but also to make the field environment uniform. In order to activate the agriculture, not only the soil of the fields is required to be made fertile, but also the fields themselves are required to be formed in a large scale to eliminate or reduce a cultivation load and increase the crop per area. The elimination or reduction of the cultivation load is achieved to some degree by a recent mechanical development, however, it is difficult to increase the crop per area. Particularly, it is unexpectable to grow crops uniformly in a large-scale field. In order to grow crops uniformly in a large-scale field, the soil environment itself must be uniform. If uniform crops can be expected in the overall field, not only the cultivation efficiency can be enhanced by enlarging the scale of the fields, but also the agriculture itself is activated.

In order to keep the environment of the paddy field in good condition, the paddy field is made transparent and kept in a good drainage condition, and an excessive preparation of the paddy field which may promote a breathing trouble of crops can be prevented. However, the excessive preparation of the paddy field must be carried out for the following reason. That is, a water supply work to a paddy field is restricted in time, and the rice-planting season is also restricted due to the growth of seedling. Therefore, in order to flatten the surface of the paddy field and perform the rice-planting work in a short time, it is necessary to minimize the preparation work of the paddy field for the rice-planting. However, the recent preparation of the paddy field is not directed to its original object, but it aims to complete the leveling work of the surface of the paddy field along the water surface in a short time by stirring the soil with water. This work needs a technically cumbersome labor and difficulties. In addition, the preparation of a paddy field is also used to enhance the effect of herbicide. If the surface of the paddy field can be leveled before water is filled in the paddy field, it is sufficient to perform the preparation work of paddy field only once, and the trouble of the preparation of paddy field does not occur. However, In Japanese agricultural situation where a rotary cultivator is mainly used, it is very difficult to horizontally flatten the surface of the field. This is because in the rotary cultivator, the depth from the surface of the field is used as a working reference and thus the unevenness of the surface of the field is left as it is. Further, the difference in hardness of the soil varies the cultivation depth, and thus the cultivation depth is not fixed. Further, the seeds of weeds are also stirred by the stirring of the soil with a rotary, and the stirring work is further needed to enhance the effect of the herbicide. Therefore, the soil of the surface of the field is greatly displaced for a year by the stirring work of the rotary, wind and the drainage environment, and thus the displacement of the soil must be corrected every year.

The leveling of the surface of the soil is carried out by a leveling machine, however, only the surface of the soil is leveled. Accordingly, a correction work for making uniform the field environment in the overall soil layer, in other words, in the depth direction.

For an ideal paddy field, it is required that an area below the surface soil, ordinarily claypan layer (not the surface of the paddy field) is kept horizontal (leveled). However, in the recent Japanese agriculture, much attention has been paid to the leveling of the surface of a paddy field. This leveling work has been generalized because it can be performed relatively easily. In an extreme case, a paddy field having a horizontal surface can be formed even when there is no surface soil. Accordingly, the water management can be easily performed, and thus it has been hitherto believed that the crop is increased by supplying fertilizer and ideal paddy field is formed. However, actually, it is an apparently ideal paddy field, and the crop is not increased. Even in such a situation, the cultivation has been carried out in consideration of the leveling of the surface of the field because it has been misunderstood that the means. Accordingly "horizontal" is limited to the "surface" of the paddy field. Accordingly, the rice crop of sufficient yield cannot be achieved by merely leveling the surface of the paddy field.

SUMMARY OF THE INVENTION

An object of the present invention is to provide a cultivating machine which is most suitable for forming paddy fields a by making the environment of fields suitable for growing crops both in crop rotation and in crop conversion not only to prepare paddy field environments suitable for rice crops, but also to develop and strengthen the Japanese agricultural industry so as to meet internationalization of Japanese agricultural industry.

Another object of the present invention is to provide a cultivating machine which is suitable for a leveling work of the surface of a field, and a field cultivating machine which is more convenient for both a converted plowed field and a converted paddy field.

In order to attain the above objects, a bottom cultivating machine according to a first aspect of the present invention comprises a laser emitter which is disposed out of a field and emits a plane signal of laser beams, a laser detector which is secured to a frame having a mast and detects the plane signal emitted from the laser emitter to output an attitude control signal, horizontal detection means for controlling the attitude of the bottom cultivating machine, the horizontal detection means including a horizontal sensor which is secured to the frame and serves to detect the level of the front end portion of the bottom cultivating machine in a cultivation progress direction, and control means for controlling the height of the bottom cultivating machine on the basis of the attitude control signal and controlling the attitude of said bottom cultivating machine on the basis of a signal output from the horizontal sensor by upwardly or downwardly moving a gage wheel or a heel having the same function as the gage wheel which is provided at the rear portion of the bottom cultivating machine.

In the bottom cultivating machine as described above, the horizontal detection means includes a detector which is disposed at the front end portion of the bottom cultivating machine at which the variation of the attitude of the bottom cultivating machine is little, and a detector which is disposed at the rear end portion of the bottom cultivating machine so that even when the attitude of the bottom cultivating machine is varied, the detector is not effected by the variation.

In the bottom cultivating machine as described above, the horizontal detection means includes horizontal sensors which are disposed at the front and rear end portions in the cultivation progression direction of the bottom cultivating machine.

In the bottom cultivating machine as described above, the gage wheel or the heel is disposed within the cultivation width of a final bottom of the bottom cultivating machine so as to be brought into contact with the wall of conglomerate.

In the bottom cultivating machine as described above, the gage wheel or the heel is disposed so as to be movable in conglomerate.

According to a second aspect of the present invention, a field cultivating machine having a mast to which an upper link mounted on a tractor is secured, comprises a photodetector which serves to detect a plane signal of a laser beam and is provided to a frame or a lower link of the field cultivating machine so as to be disposed within a plane which is drawn by the laser beam, a fulcrum member disposed at the rear end portion of the frame, and a cultivating function machine which is disposed at least between the mount point of the lower link and the fulcrum member, wherein a free zone is provided to the mast or the upper link or provided at a mount position of a tractor and the upper link, the mount point of the upper link being freely movable in a cultivation progress direction substantially within the free zone, the attitude of the field cultivating machine being controlled on the basis of the plane signal by the output power of a lift control mechanism of the tractor so that the photodetector is located within the plane drawn by the laser beam.

According to a third aspect of the present invention, a field cultivating machine which is mounted on a tractor by a hauling system or linkage draw bar system, comprises a photodetector which serves to detect a plane signal of a laser beam and is provided to a frame or a lower link of the field cultivating machine so as to be disposed within a plane which is drawn by the laser beam, a fulcrum member disposed at the rear end portion of the frame, and a cultivating function machine which is disposed at least between the mount point of the lower link and the fulcrum member, wherein a free zone is provided to the mast or the upper link or provided at a mount position of a tractor and the upper link, the mount point of the upper link being freely movable in a cultivation progress direction substantially within the free zone, the attitude of the field cultivating machine being controlled on the basis of the plane signal by the output power of a lift control mechanism of the tractor so that the photodetector is located within the plane drawn by the laser beam.

In the field cultivating machine as described above, the cultivating function machine comprises a bottom cultivating machine.

In the field cultivating machine as described above, the cultivating function machine comprises a leveling machine.

In the field cultivating machine as described above, the cultivating function machine has a stirring function of a rotary or a paddy harrow.

In the field cultivating machine as described above, the cultivating function machine comprises a rake.

In the field cultivating machine as described above, the cultivating function machine comprises any one of a beam standard of a sub soiler, a ditch cutting machine and a hilling machine.

In the field cultivating machine as described above, the fulcrum member comprises a wheel, a roller or a warp member which is brought into contact with the surface of a field.

According to the present invention, the soil can be plowed in the paddy field plowing work while keeping the soil pad to be flat horizontally. Therefore, even when the surface environment of the field is uneven, the paddy field can be finally formed to have an uniform soil layer. Accordingly, the scrapping work can be performed with the minimum load, and crops of high quality are expected to be grown uniformly in all the areas. Therefore, the harvest can be increased, and the cost can be reduced.

Further, particularly in the case of the bottom cultivating machine, the height control can be performed at the front portion and the rear portion, so that the flattening of the soil pad can be easily performed. In addition, the soil which is plowed for soil turning is dried in a short time, and thus the next cultivating work can be started after a short time. Further, the gage wheel and the heel are shifted along the bottom of the conglomerate which is turned by the bottoms, so that the cultivating machine is shifted horizontally, and the horizontal attitude of the bottom cultivating machine can be kept surely.

Still further, when the cultivating function machine is upwardly and downwardly moved by the lift mechanism of the tractor, there is provided a clearance, so-called a free zone between the mast and the mount point of the upper link.

Therefore, the mount point can be freely moved in a fixed range. Particularly, the fulcrum member at the rear end portion of the cultivating machine is brought into contact with the surface of the field at all times, and thus the cultivating machine can perform the cultivation work while keeping a stable attitude. Therefore, the cultivating machine can be controlled to have an upward and downward motion width which is smaller than the actual upward and downward control width by the lift mechanism of the tractor. Accordingly, even when a large uneven portion exists in the field, the field surface can be finished to have relatively small unevenness (which is dependent on the running speed of the tractor). Therefore, the uniformity of the field condition can be performed.

Further, when the cultivating machine is a sub soiler, the bottom of a ditch or the like can be formed along the reference plane.

Further, according to the present invention, in the control of the upward and downward motion by using the lift mechanism of the tractor, the cultivating function machine is upwardly and downwardly moved by using the fulcrum member as a fulcrum. Therefore, the cultivating machine can be kept in a stable state, and the upward and downward motion control width of the cultivating machine is reduced to be smaller than the actual upward and downward motion control width of the tractor. Therefore, the surface of the field can be surely finished to be parallel to the reference plane.

Further, even when the cultivating machine is mounted by the linkage draw bar or in the hauling manner, the cultivating machine is controlled to be upwardly and downwardly moved while using the fulcrum member as a fulcrum. Accordingly, the field can be leveled to have a flat surface and also it can be finished to be flat for another working object.

DETAILED DESCRIPTION OF PREFERRED EMBODIMENTS

Figure 1:
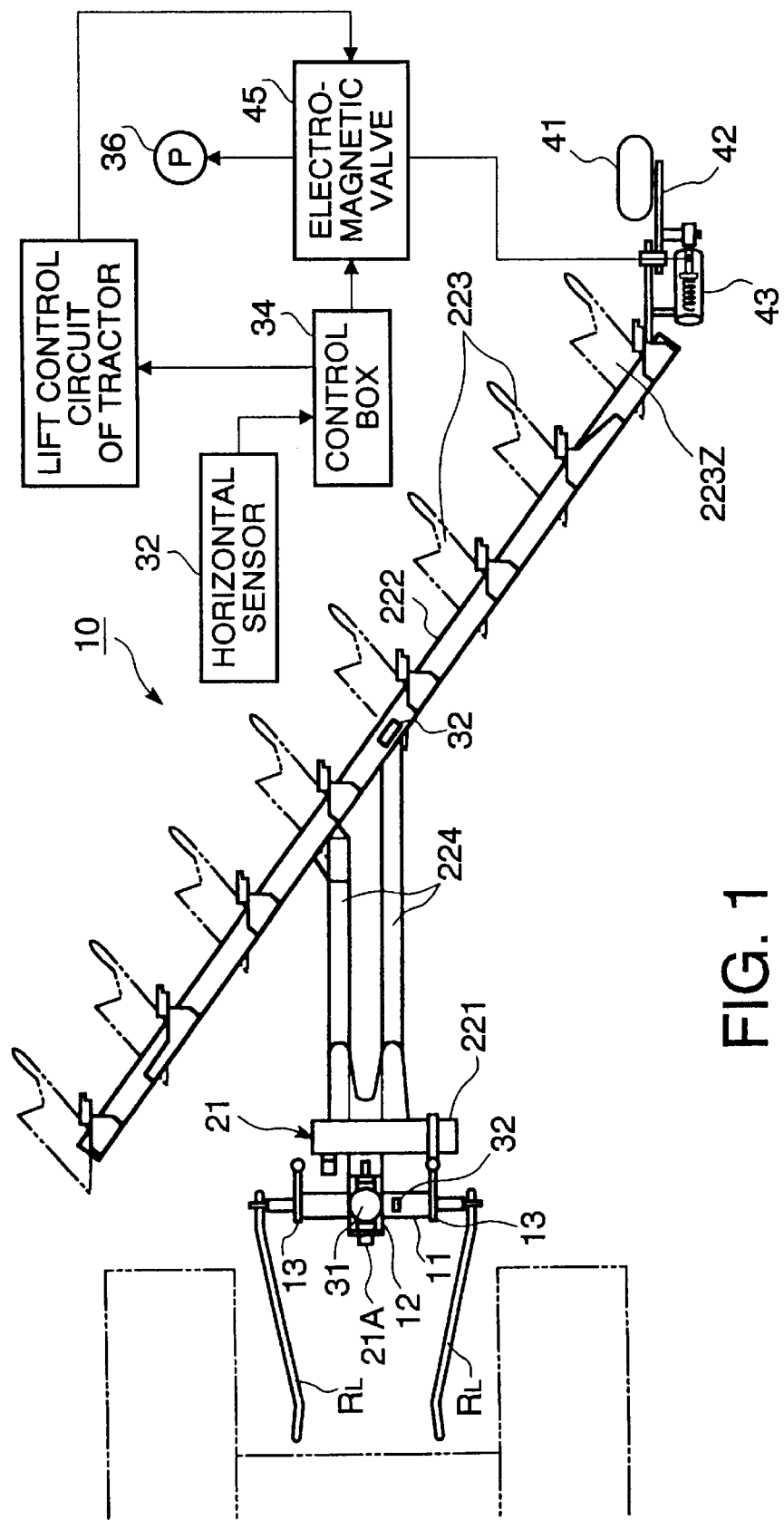
FIG. 1 is a plan view showing a bottom cultivating machine according to the present invention.
Figure 2:
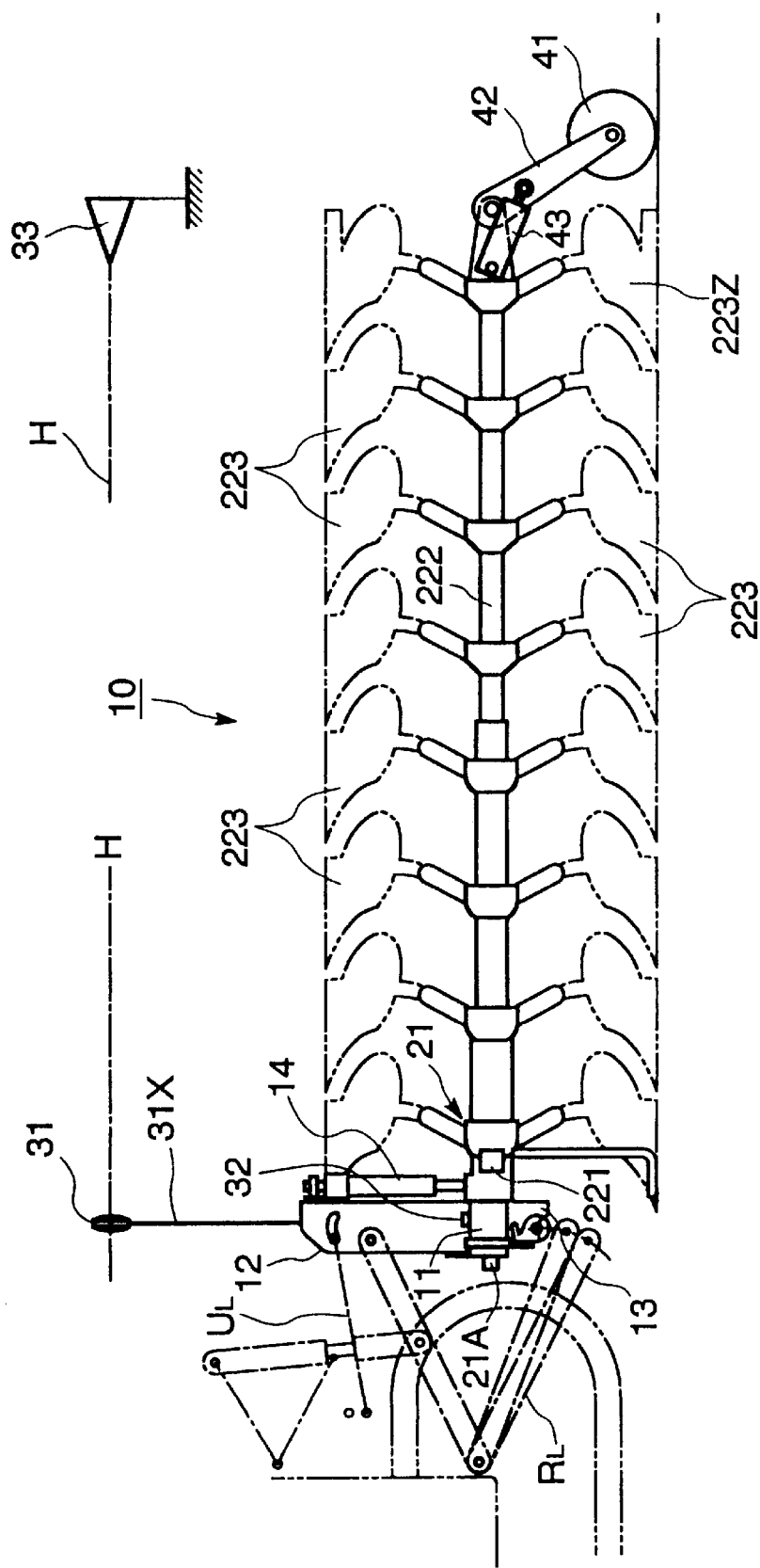
FIG. 2 is a side view showing the cultivating machine according to the present invention.

Preferred embodiments according to the present invention will be described with reference to the accompanying drawings.

First, a bottom cultivating machine and a cultivating method therefor of a first embodiment to which the present invention is applied will be described. FIGS. 1 to 4 show a reversible type bottom plowing machine (hereinafter referred to as "cultivating machine") which is a typical cultivating machine for plowing a soil layer (soil pan) horizontally.

Reference numeral 10 represents the overall construction of the cultivating machine, and the cultivating machine 10 comprises a front frame 11 which does not change its attitude even during a reverse motion, and a reverse frame which is rotated relatively to the front frame 11. The front frame 11 has a mast 12 on which an upper link UL of a tractor is mounted, and also has a lower frame 13 on which a lower link RL extending in a left-and-right (horizontal) cultivating width direction is mounted at the lower end portion thereof.

The reverse frame 21 is secured to the front frame 11 through a rotational main shaft. The reverse frame 21 is linked to the lower end portion of a reverse cylinder 14 whose upper end portion is pivotally mounted on the mast 12, and the reverse frame 21 is reversible by an expansion and contraction motion of the cylinder 14. The reverse frame 21 has a main frame 221 extending in the cultivating width direction, and a securing frame 222 for securing a bottom which is disposed to be intersected to the main frame 221 (i.e., the cultivating width direction). Eight pairs of upper and lower bottoms 223 are secured to the securing frame 222 to construct a 8-link bottom cultivating machine.

The securing frame 222 is supported by two support arms which extend rearwardly from the main frame 221, and the securing frame 222 is supported at the rear end portion of the support arm 224.

The front frame 11 and the main frame 221 are freely rotatably supported by a support shaft 21A which will be a rotational center when the reverse motion is performed. A laser detector 31 is fixed to the mast 12 through a pole 31X, and it detects a plane signal H emitted from a laser emitter 33, and the height of the mast 12 is controlled so that the laser detector 31 is located on the plane drawn by the plane signal H at all times. The control of the height is performed by using a lift mechanism of the tractor. In other words, the control is performed so that the hitch point (securing position) of the lower link of the tractor is located at the fixed height at all times. That is, the cultivating machine is kept at the fixed height by upwardly and downwardly moving the front end portion of the cultivating machine in the cultivation progress (tractor running) direction. In other words, this control corresponds to a lower link control by the lift mechanism of the tractor.

Further, the height of the rear end portion of the cultivating machine in the cultivation progress direction is performed by upwardly and downwardly moving a gage wheel or the like, whereby the cultivating machine 10 is controlled to be kept in a horizontal position as a whole. As described above, the height of the mast 12 is controlled by the signal which is detected by the laser detector 31. Further, an opening/closing valve of an electromagnetic valve 45 of a hydraulic circuit as described later is controlled by processing a signal output from a horizontal sensor 32 in a control box 34 (microcomputer).

More specifically, the gage wheel 41 is disposed at the most end position of the bottom frame 222, and it is located at the rear side of the final bottom 223Z. The gage wheel 41 is secured to the tip portion of a swing arm so as to be freely rotatable relatively to the bottom frame 222. The swing arm 42 can vary the angle to the ground (θ) by expanding/contracting a control cylinder 43. In other words, the ground clearance (height from the ground) of the rear end portion of the bottom frame 222 can be controlled. By controlling the gage wheel 41, the horizontal state in the forward and rearward direction of the cultivating machine 10 as well as the horizontal direction in the right-and-left direction of the cultivating machine 10 can be controlled. The signal which is obtained from the horizontal sensor 32 is transmitted to the hydraulic circuit of the horizontal control circuit provided to the tractor. The control cylinder 43 is controlled by using the hydraulic circuit. Both a double-acting type and a single-acting type may be used as the control cylinder 43. In this embodiment, the single-acting type is used. The expansion of the control cylinder 43 is performed by a compression spring and the contraction of the control cylinder 43 is performed by supplying pressure oil to the cylinder. In this case, a return circuit of a pressure oil chamber 43A may be omitted, and it may be substituted by one-way valve in a piston.

Figure 3:
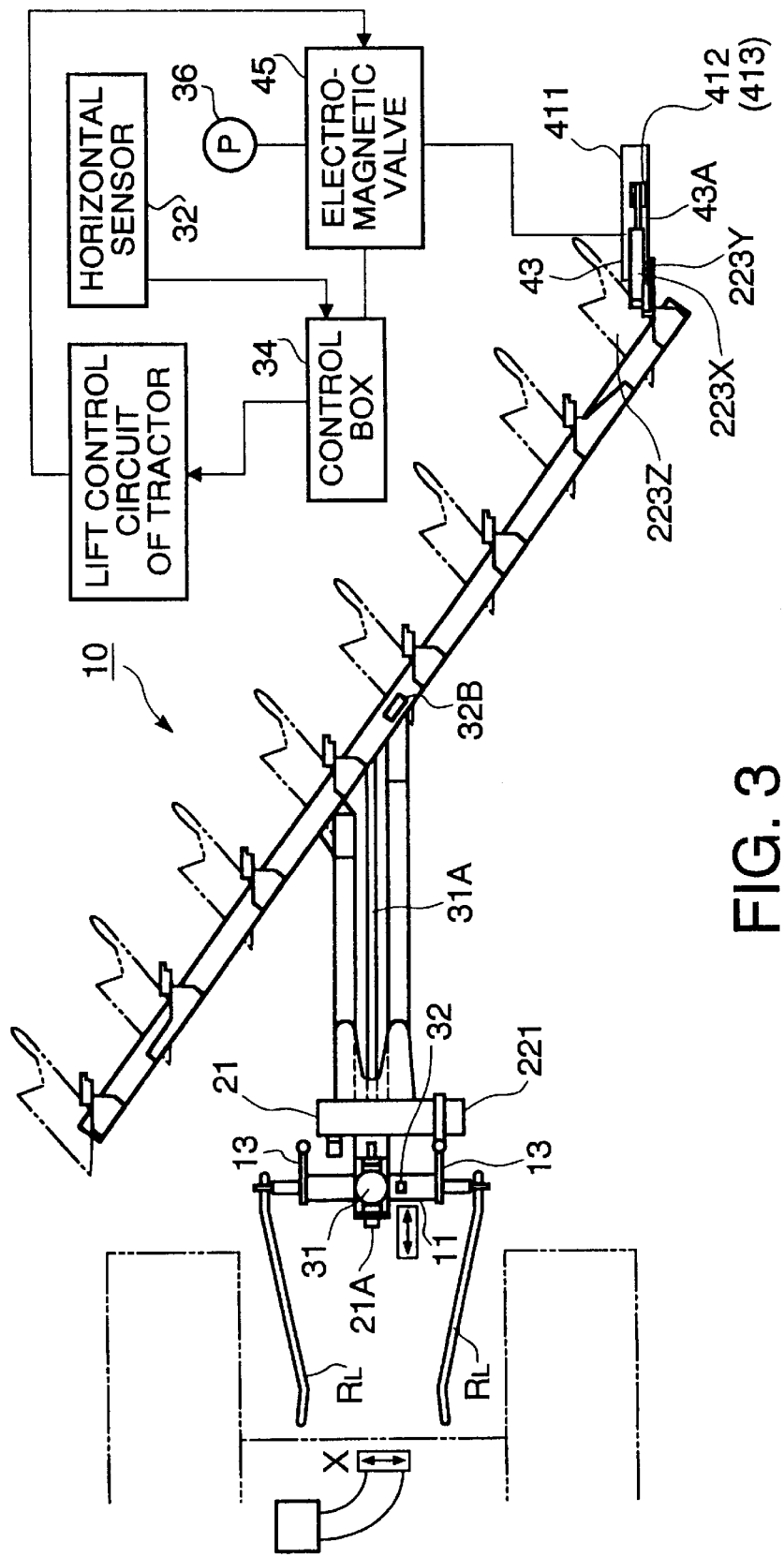
FIG. 3 is a plan view showing a control system installed in the bottom cultivating machine according to the present invention.
Figure 4:
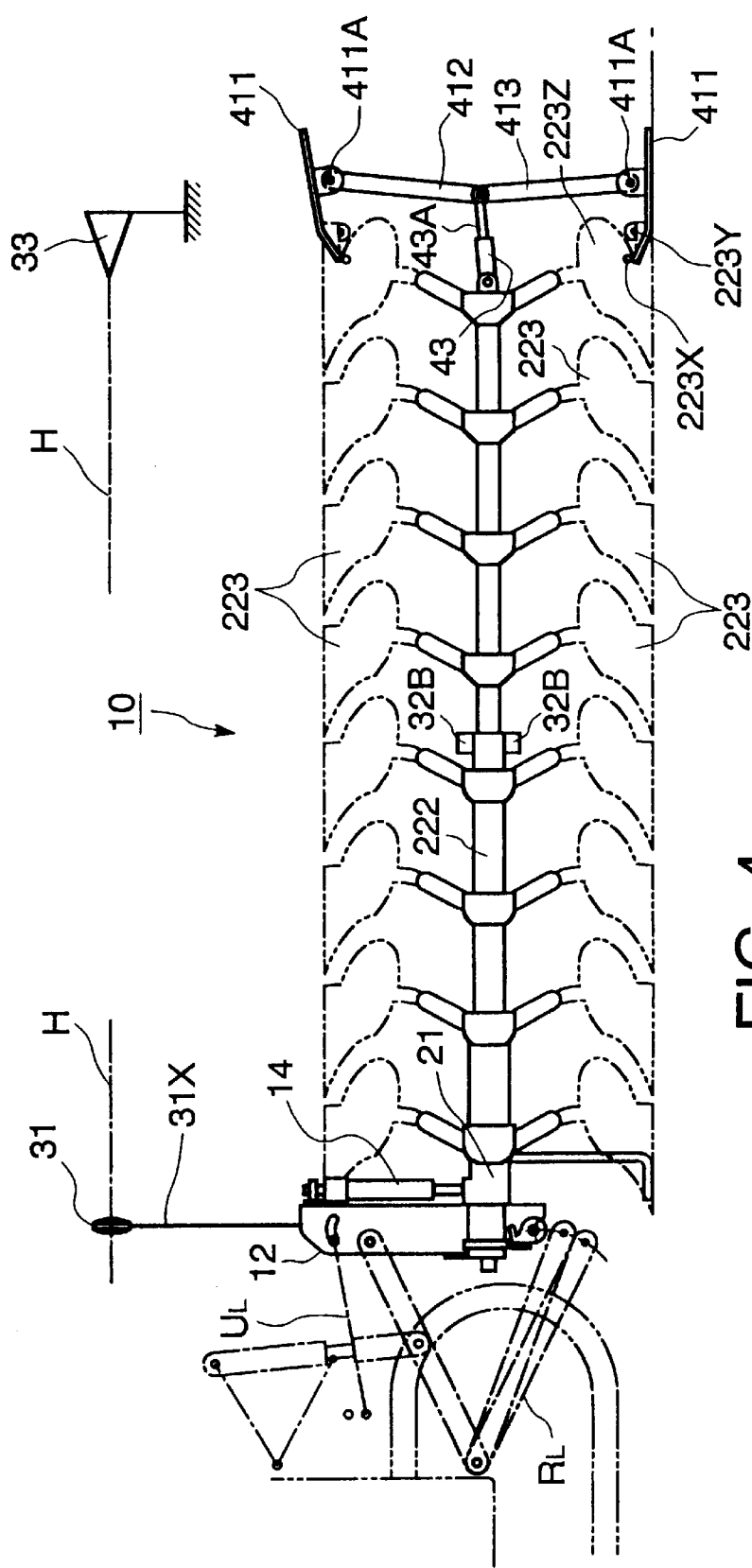
FIG. 4 is a side view showing another embodiment of the bottom cultivating machine according to the present invention.

In the above case, the height of the bottom 223 is selected by adjusting the height of the gage wheel 41. However, in place of the gage wheel 41, a heel 411 may be used. That is, as shown in FIGS. 3 and 4, the end portion of the rod 43A of the control cylinder 43 is linked to the center position of heel support members 412, 413 which are arranged in a V-shape, and heels 411 are fixed through pins 411A to the heel support members 412, 413, and the heels 411 are secured to the land sites of the final bottoms 223Z located at the most rear position of the bottoms 223 through pins 223Y so as to abut against stoppers 223X at the front side position from the pivot points of the heels, thereby preventing the bottom portion from being floated.

Accordingly, by expanding the control cylinder 43A in a state where the heels 411 come into contact with the ground, the rear end portion of the bottom frame 222 to which the bottoms are secured and also the heels 411 are secured as a stretching member, is pushed up. This control is performed when the bottom group is declined at the rear side thereof, thereby keeping the cultivating machine in a horizontal position as a whole. Conversely, when the bottom group is detected to be inclined at the rear side thereof, the heel 411 which is brought into contact with the ground is lifted up by contracting the control cylinder 43A, whereby the bottom group is declined at the rear side by an amount corresponding to the lift-up of the heel 41, and thus the cultivating machine is kept in a horizontal position as a whole. These control operations are the same as the gage wheel, and the horizontal attitude of the cultivating machine 10 is controlled on the basis of the signal obtained by the horizontal sensor 32 with the horizontal control circuit and the lift mechanism of the tractor, or by the control of the gage wheel or the heels, whereby the soil pad S of the field can be controlled to be horizontal (leveled) irrespective of the condition of the surface of the soil.

Figure 5:
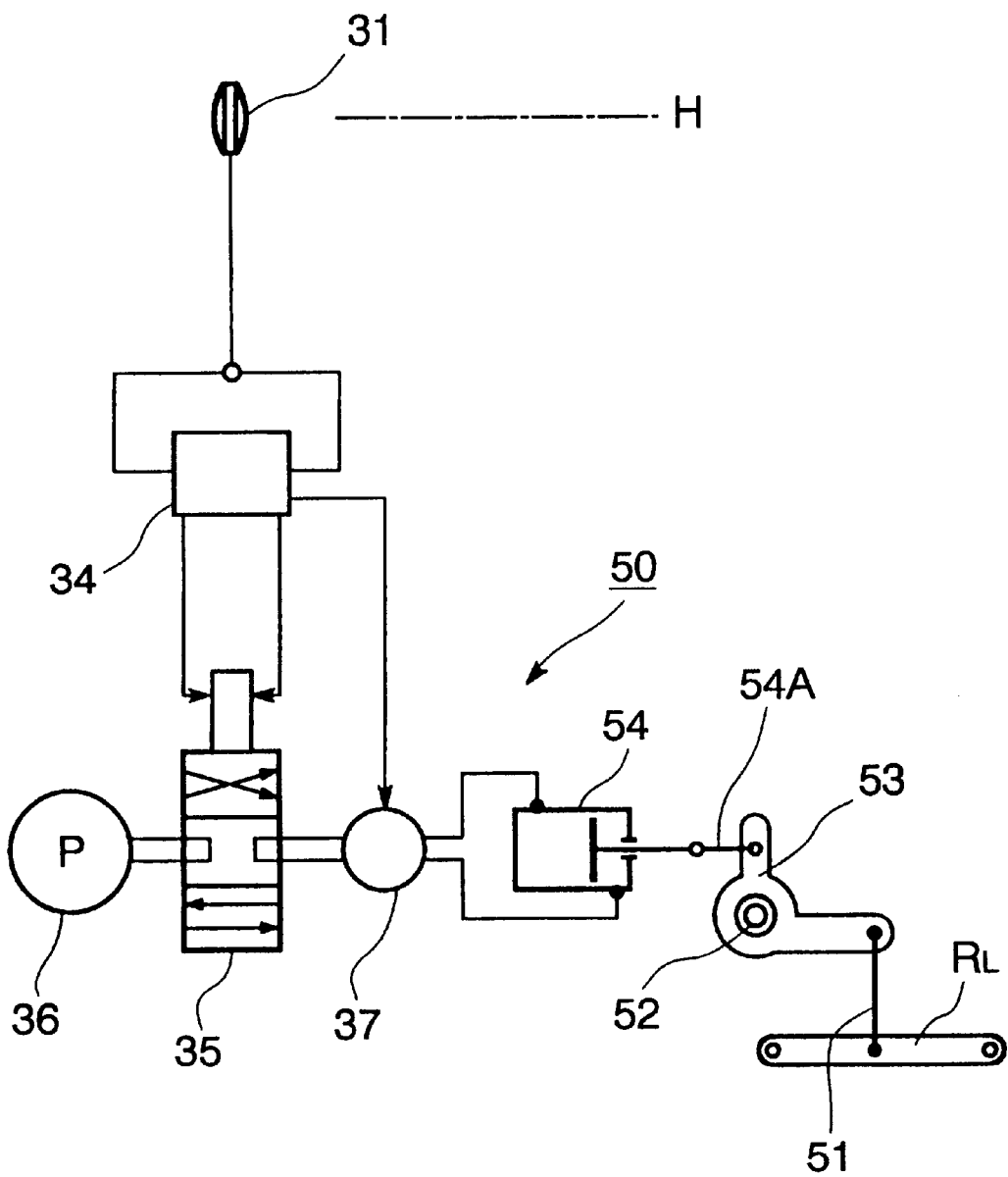
FIG. 5 is a diagram showing the control system of the bottom cultivating machine according to the present invention.

The lower link RL of the tractor is linked to the end portion of the lift rod 51 constituting the lift mechanism 50 shown in FIG. 5, and a lift arm 53 is extended at the opposite side to the pivot point 52. A rod 54A of the lift cylinder 54 is linked to the end portion of the lift arm 53, and the lift arm 53 is rotated by the expansion and contraction motion of the lift cylinder 54 to upwardly and downwardly move the lower link RL through the lift rod 51.

The lift cylinder 54 is controlled by the plane signal H from the light emitter 33 which is detected by the laser detector 31 as shown in FIG. 5, and a driving source of the tractor is driven by pressure oil from a hydraulic pump 36. That is, the signal is input to a control circuit 34 containing a control microcomputer, and the front portion of the cultivating machine 10 is upwardly and downwardly moved by the control circuit 34 to keep the cultivating machine at a fixed height. In other words, the soil pad which is formed by the bottoms is controlled to be horizontal. This control is performed by using a change-over valve 35 for switching flow of pressure oil in response to the signal from the control circuit 34, and the pressure oil is supplied from the pump 36 through a flow amount control valve 37 to the lift cylinder 54. The opening degree of the flow amount control valve 37 is controlled in response to the signal from the control circuit.

Figure 6:
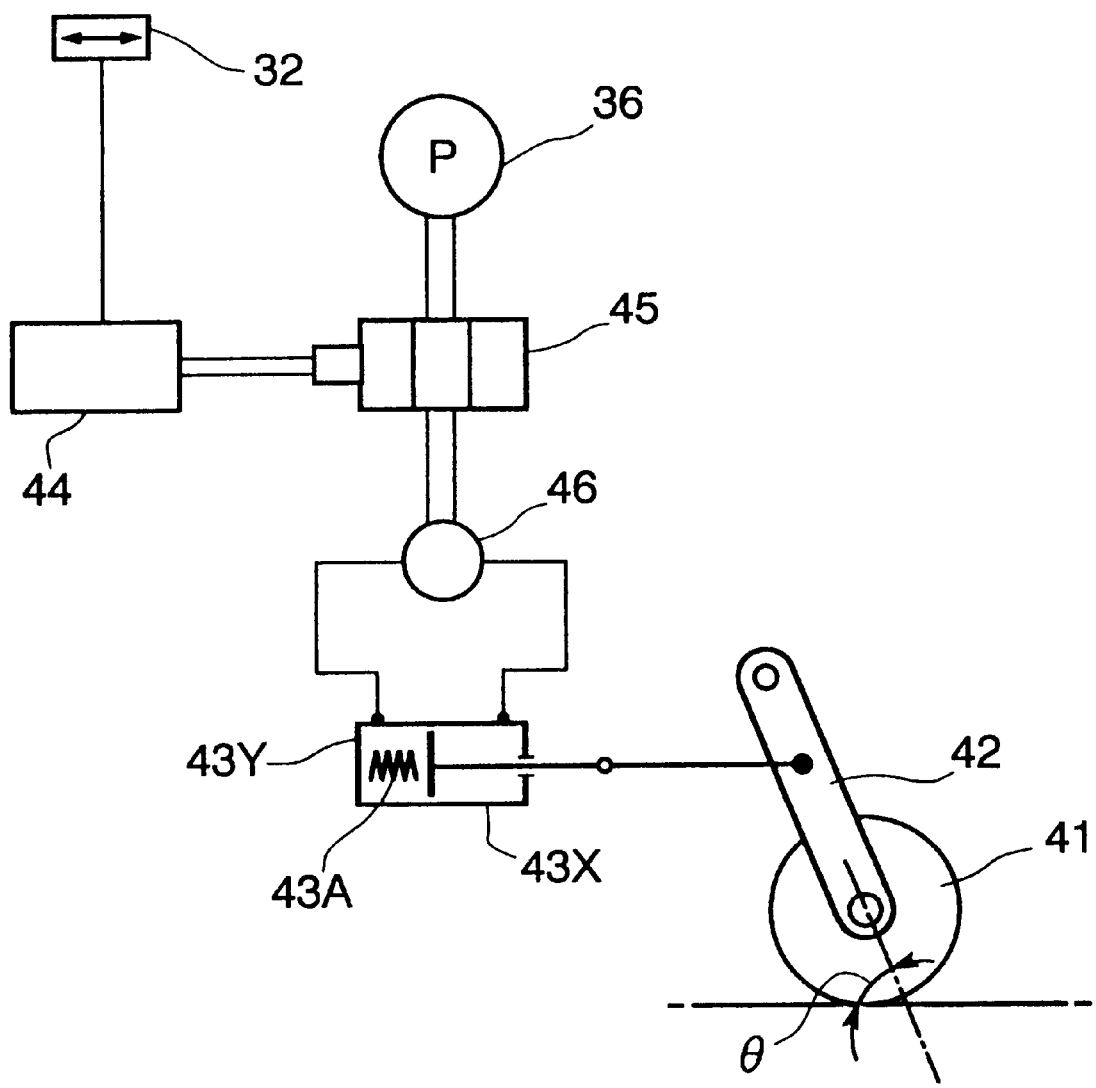
FIG. 6 is a diagram showing a control system for a leveling machine.

In FIG. 6, the signal of the horizontal sensor 32 is processed by the control circuit 44 to drive the horizontal control circuit of the tractor, and the gage wheel 41 or the heel 411 is controlled to upwardly and downwardly move the rear end portion of the cultivating machine 10, whereby the horizontal attitude of the cultivating machine can be kept in a horizontal position as a whole.

Further, the horizontal attitude in the travel direction of the cultivating machine 10 is controlled by upwardly and downwardly moving gage wheel 41. That is, when the cultivating machine 10 is lifted up at the front side thereof, the cylinder 43 is expanded to increase the angle to the ground θ (angle to the horizontal plane) of the swing arm 42 for supporting the gage wheel 41 and to control the rear portion of the cultivating machine 10 to be upwardly moved_@ so that the cultivating machine is kept in a horizontal position as a whole, in other words, the soil pad S formed by the bottoms 223 is kept to be horizontal.

Although the lift mechanism shown in FIG. 5 is controlled on the basis of the signal from the photodetector 31, for the mechanism for moving the gage wheel 41 upwardly and downwardly, the flow amount of the driving pressure oil is controlled through the control circuit 44 on the basis of the horizontal signal from the horizontal sensor 32. First, the pressure oil from the hydraulic pump (the same as the hydraulic pump as described above) is supplied through change-over valve 45 and the flow-amount control valve 46 to the control cylinder 43. By swinging the swing arm 42, the angle to the ground θ is varied. If the angle to the ground is increased, the control cylinder 43 is contracted, and the pressure oil is supplied into the pressure oil chamber 43X in the cylinder. At this time, the compression spring 43 which is provided in the pressure oil chamber 43Y acts to urge the piston, so that the pressure oil whose pressure is over the resistance force of the compression spring 43A is applied. In other words, if the left end portion of the cultivating machine 10 is required to be lifted up, the control cylinder 43 is contracted. Conversely, when the left end portion is required to be depressed, the control cylinder is expanded. Through the above operation, the attitude of the cultivating machine is controlled. This control is also usable for the horizontal control in the forward and backward direction of the cultivating machine 10. That is, as the angle to the ground is increased, the rear end portion of the cultivating machine 10 is lifted up. Conversely, as the angle of the ground is decreased, the rear end portion of the cultivating machine 10 is lowered.

Since the compression spring 43A pushes the piston at all times, the piston is pushed by merely releasing the pressure oil of the pressure oil chamber 43X, so that the control cylinder 43 is expanded. In addition, if the cultivating machine 10 is lifted to perform the reverse motion, the swing arm 42 is released from the restriction like the ground surface with which the gage wheel is brought into contact, so that the swing arm 42 is rotated in such a direction that the gage wheel 41 is brought into contact with the ground at all times due to the dead weight of the gage wheel 41, etc.

Such an operation is controlled by the signal from the horizontal sensor 32, and the attitude of the cultivating machine 10 is detected to display the attitude status for an operator. Most primitively, the operator may manually expand and contract the control cylinder 43 or the lift cylinder 54 of the lift mechanism. However, according to this embodiment, this control can be automatically and accurately performed.

Further, a driving power source which is inherently mounted in the tractor may be used as a driving power source of each control, in other words, as a hydraulic oil driving source. In addition, since the horizontal sensor of the tractor is oriented in the width direction of the cultivation progression direction, in order to use this sensor as a detector for the horizontal control in the direction along the cultivation progress direction, the sensor is used while rotated by 90 degrees.

In the foregoing description, the photodetector 31 and the horizontal sensor 32 are used to detect whether the cultivating machine 10 is located on a predetermined plane. The horizontal attitude of the cultivating machine may be detected by using two photodetectors 31A and 31B to control the attitude. In this case, one photodetector 31A is secured to the front frame as described above, however, the other photodetector 31B is secured to an arm 32X which is extended rearwardly from the front frame 11 so that the attitude thereof is not varied even when the frame 222 is reversed, in other words, even when the attitude of the photodetector 31B is not varied even when reversed. Accordingly, the photodetector 31B can be kept in an erect position even when the main frame 222 is reversed. At any rate, the height of the front end portion of the cultivating machine, in other words, the height of the lower link RL is controlled by the photodetector 31A, and the height of the rear end portion of the cultivating machine is controlled by the photodetector 31B. In the foregoing description, the bottom cultivating machine comprises a reversible type bottom cultivating machine. However, a standard type bottom cultivating machine which is not reversible may be used.

In the foregoing description, in order to level the soil pad S of the field, the attitude of the cultivating machine 10 is controlled. Next, a cultivating machine for leveling the surface of a field after the plowing for soil turning is performed by using the cultivating machine 10, a so-called leveling machine 60 will be described.

Figure 29:
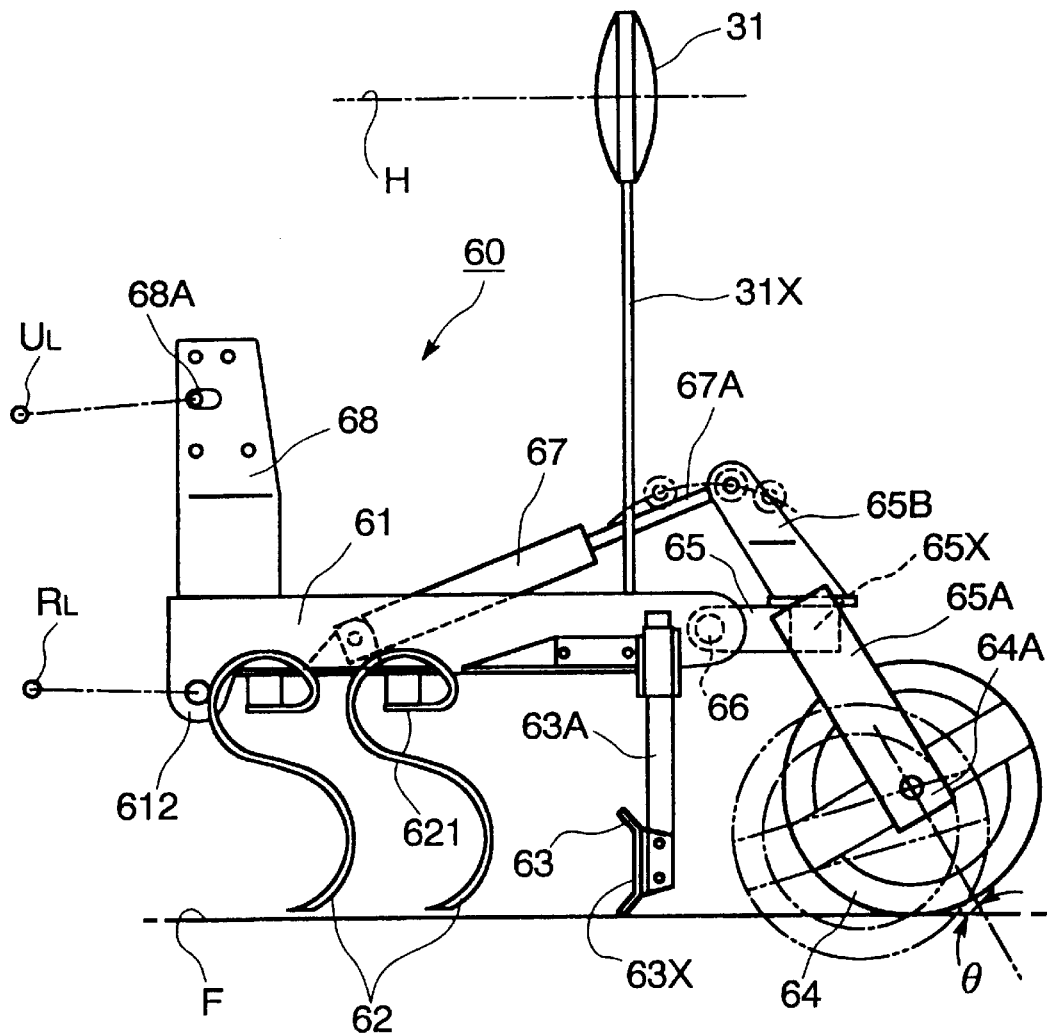
FIG. 29 is a side view showing a leveling machine according to the present invention.
Figure 30:
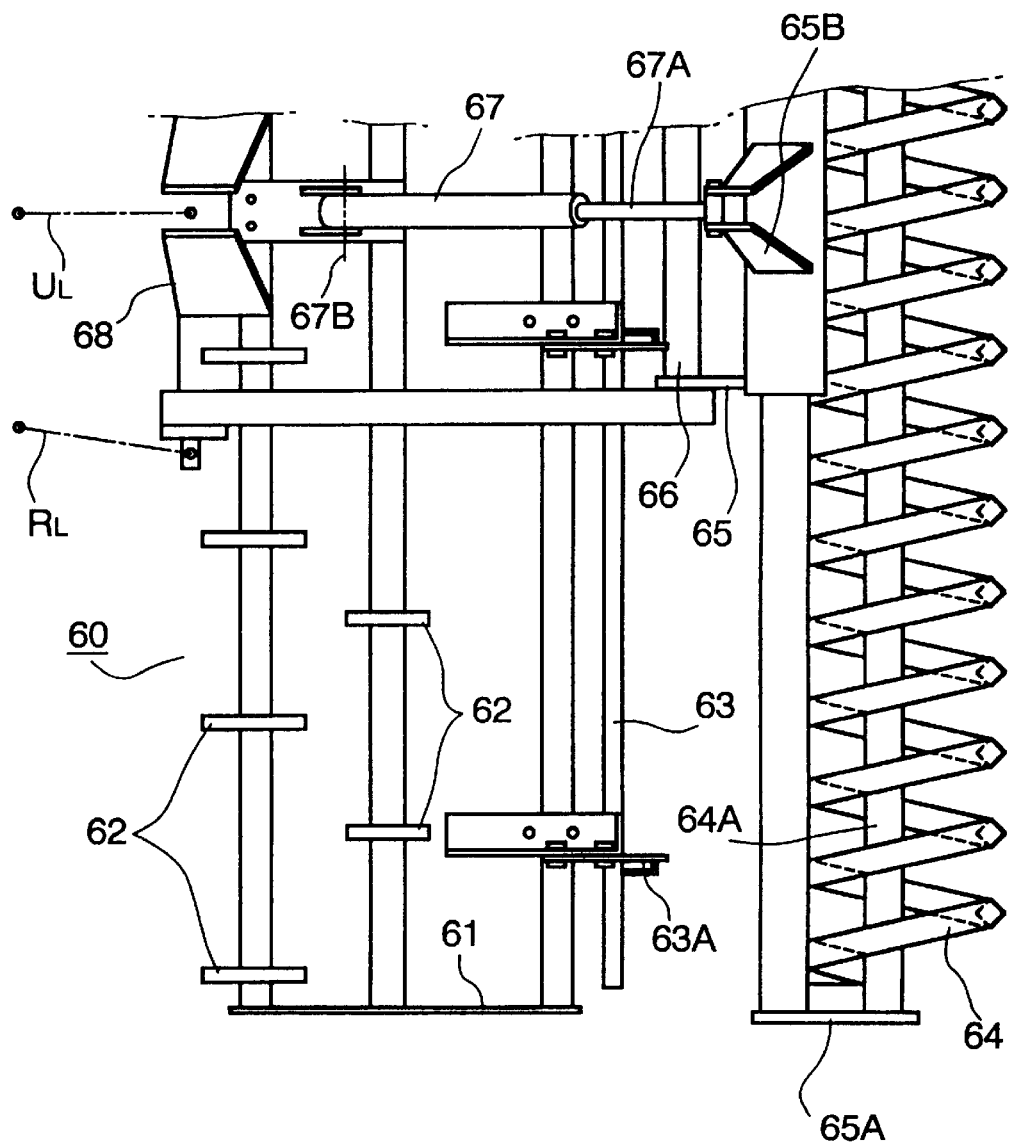
FIG. 30 is a partial side view of the leveling machine of the present invention.

As shown in FIG. 29, a leveling machine 60 is designed so that the frame 61 of the cultivating machine is provided with a tine- or disc-shaped harrowing machine 62, a leveler 63 and a spring-coil type repressing machine 64 which are arranged from the head of the cultivation progress direction in this order. Therefore, the leveling machine 60 is different from a simple leveler, but it should be called as a leveling hybrid cultivating machine. The rotational center shaft of the frame 65 of the repressing machine 64 is supported at both the right and left ends of the repressing machine by the tip portion of the arm 65A. The frame 65 is secured to the frame 61 of the cultivating machine so as to be rotatable in a vertical plane by a pivot shaft 66. More specifically, a mast 65B is erected on a horizontal portion of the frame 65, and the end portion of a rod 67A of an expansion cylinder 678 as described later is secured to the mast 65B. The frame 65 is allowed to upwardly and downwardly move around the pivot pin 66 relatively to the frame 61 in the vertical plane of the cultivation progress direction by the expansion and contraction of the rod 67A.

The angle to the ground θ of the support arm 64A for supporting the repressing machine 64 is varied by the expansion and contraction of the expansion cylinder 67 to control the height of the gap between the lower end edge 63X of the leveler 63 and the surface of the ground, in other words, the gap between the lower end edge 63X of the leveler 63 and the surface of the field (actually, the lower end edge 63X is brought into contact with the surface or intrude into the surface).

The leveling machine 60 is also hauled by the tractor. Therefore, it is designed to have a mast 68 to which the upper link UL is secured, a pair of mount plates 612 which are disposed at a suitable interval to secure the lower link RL to the leveling machine 60, and an arm type support plate 613 which is inserted in the space of the gap so as to extend forwardly in the cultivation progress direction of the frame 61 and supported at one point by a hitch pin 611 so as to be freely rotatable around the hitch pin 611 on the horizontal plane. The hitch pin 611 is located at the front side of the lower link RL so that the tractor is allowed to travel along a curved line. Accordingly, in a field of a section, the continuous cultivation work can be performed without forming a headland.

The laser detector 31 which is provided to the frame 61 so as to erect from the frame 61 detects the plane signal H emitted from the laser emitter 33 which is provided at the outside of the field to perform the expansion and contraction control of the expansion cylinder 67. The control is performed so that the laser detector 31 is located within a plane which is drawn by the horizontal signal H, for example, within a horizontal plane. That is, the control is performed in the same control as the control of the angle to the ground of the gage wheel 41, that is, the height of the gage wheel 41 in the bottom cultivating machine 10 as described above. In place of the swing arm 42 shown in FIG. 2, the angle to the ground θ of the support arm 65A is controlled, and the coil constituting the repressing machine 64 achieves the same function as the gage wheel 41.

The leveling machine 60 is provided with the laser detector 31 for detecting a laser beam emitted from the laser emitter 33 which is erected at a suitable position on the field. If the laser detector 31 is located at all times within the horizontal plane which is a reference plane drawn by the plane signal, the cultivating machine 60 could work within the fixed horizontal plane, and thus the work for leveling (flattening) the surface of the field can be performed. Further, if the plane signal H is emitted in a slant angle, the field can be formed to have a slant surface.

If the leveler 63 is located at a position which is deeper than a predetermined depth, the expansion cylinder 67 is expanded to locate the coil constituting the repressing machine 64 at a deep position, in other words, to increase the angle to the ground θ of the swing arm 65A, whereby the position of the leveler 63 is shifted up. In this case, the leveler 63 is upwardly and downwardly moved with the repressing machine 64 acting as a fulcrum.

When the leveler 63 is located at a position which is shallower than the predetermined depth, the repressing machine 64 is moved upwardly by reducing the angle to the ground θ of the swing arm 65A, whereby the position of the leveler 63 is lowered. This operation causes the expansion cylinder 57 to be contracted, so that the angle to the ground θ of the swing arm 65A is reduced. The leveling machine 60 is hauled by the tractor to level the surface of the field while the above operation is repeated.

Figure 7:
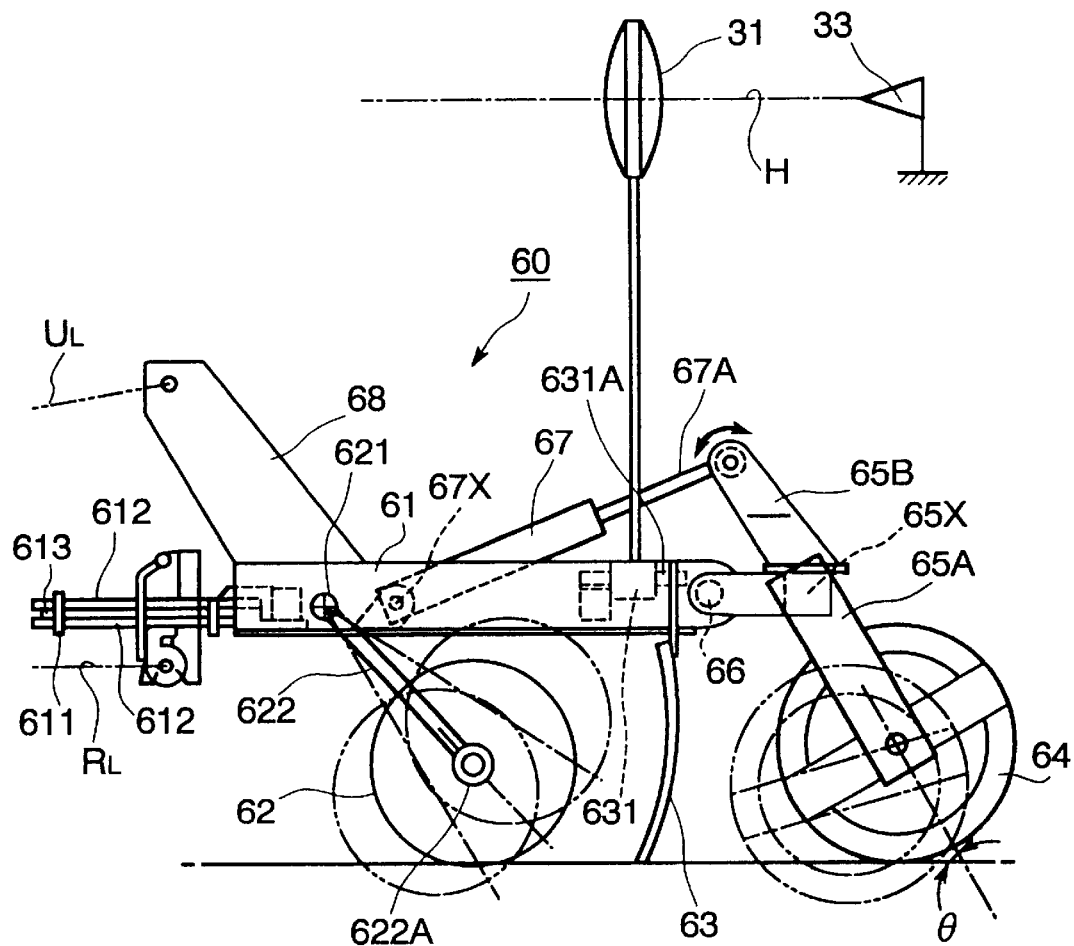
FIG. 7 is a side view of the leveling machine.
Figure 8:
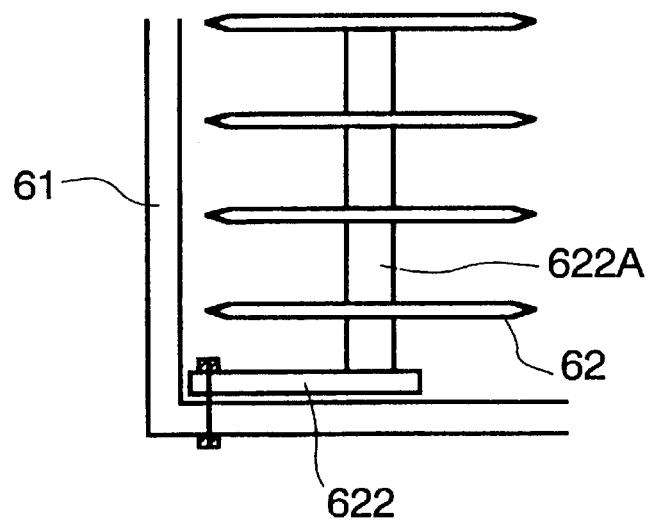
FIG. 8 is a plan view showing a part of the leveling machine.
Figure 9:
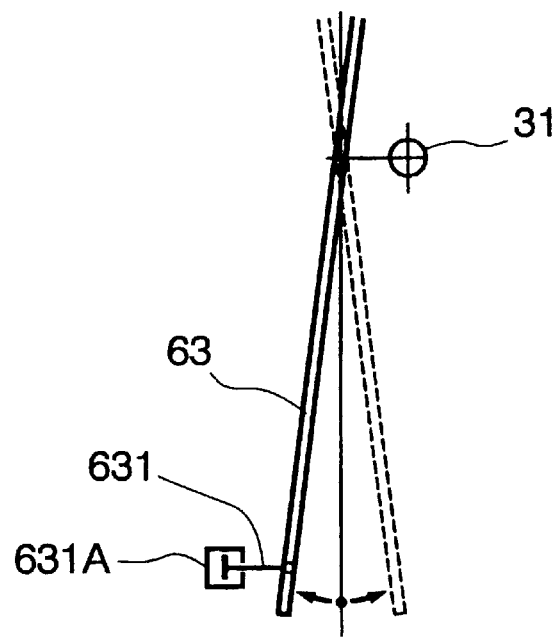
FIG. 9 is a plan view showing a part of the leveling machine.
Figure 10:
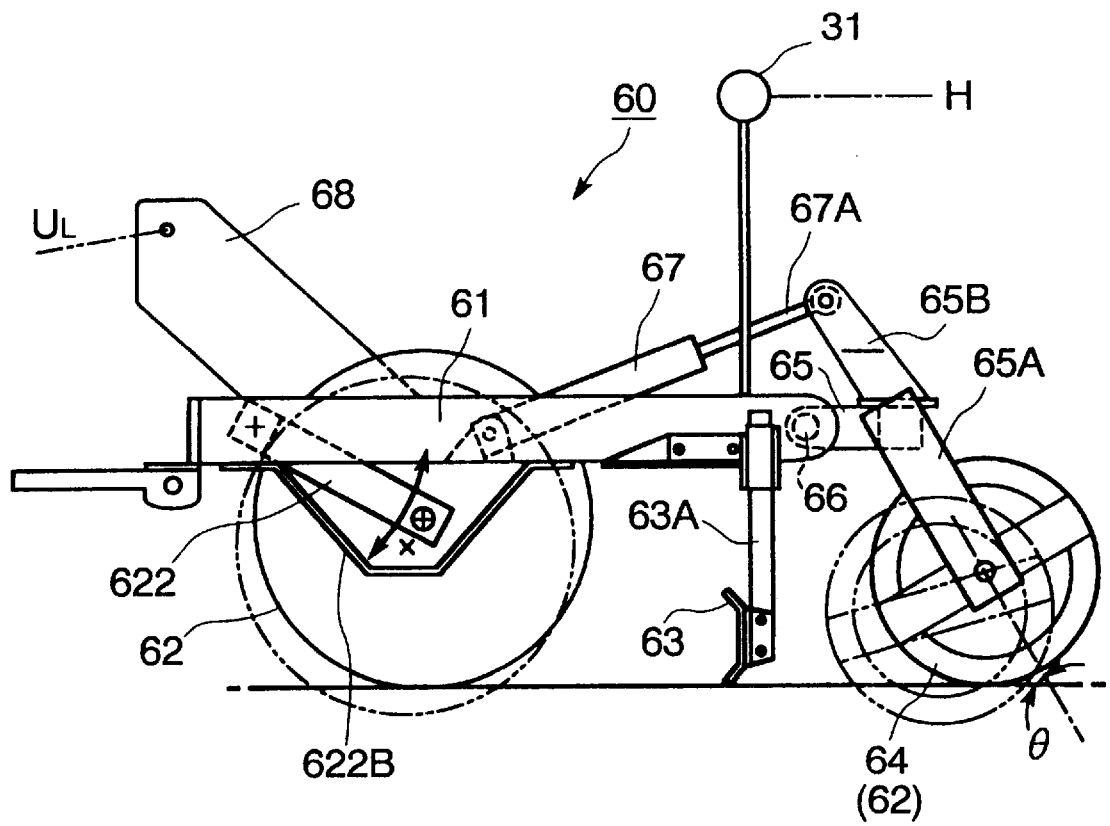
FIG. 10 is another side view showing the leveling machine.
Figure 11:
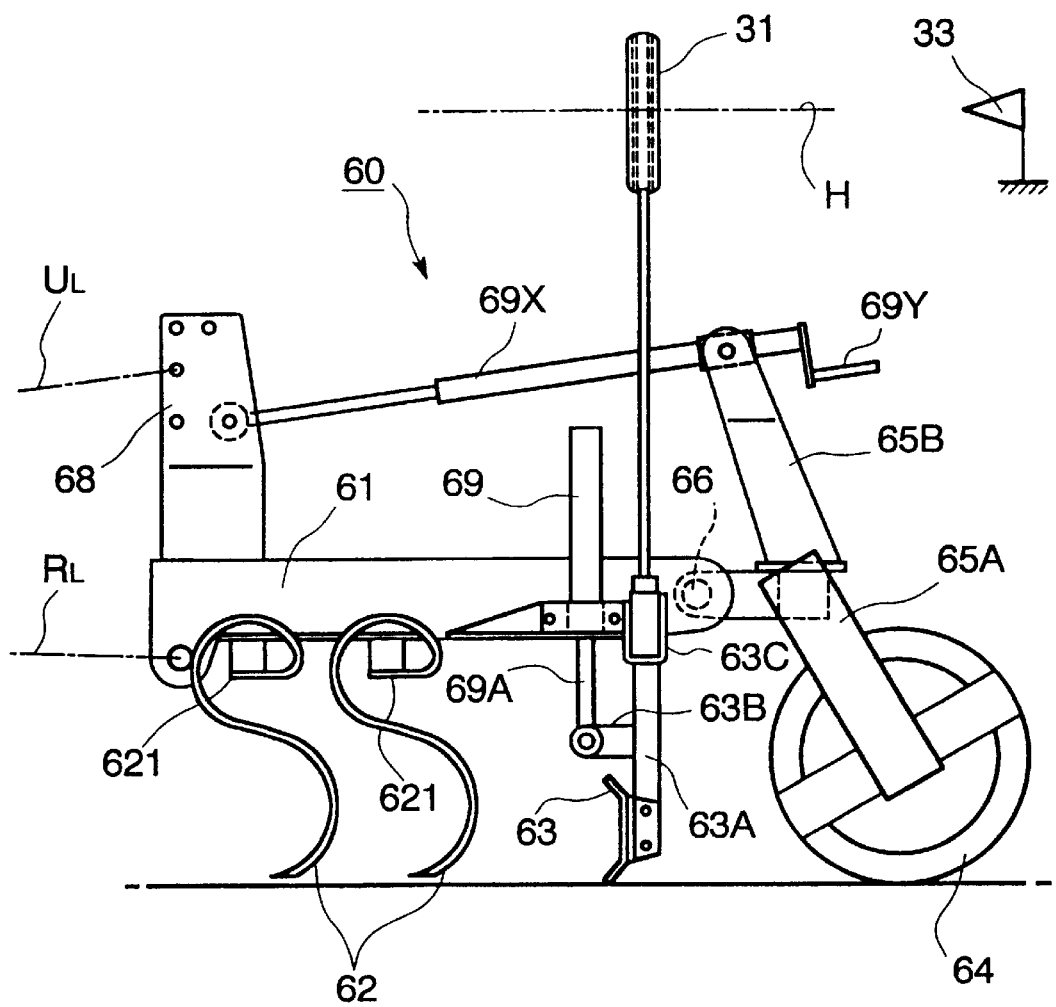
FIG. 11 is another side view showing the leveling machine.

Further, as shown in FIGS. 7 and 8, one end portion of the center shaft 622A of the harrowing machine 62 is supported by an arm 622 which is pivotally supported by the frame 61, and the other end portion of the arm 622 is movable while drawing an arcuate shape. That is, the harrowing machine 62 is swingable upwardly and downwardly around the pivot point. The rod 631A of the cylinder 631 is secured to any one of the right and left end portions of the leveler 63, and the angle of the leveler 63 to the cultivation progress direction is varied by expanding or contracting the cylinder 631 to adjust mulching direction.

Next, a leveling work when the scale of a paddy field is enlarged by using the leveling machine as described above will be described.

Figure 12:
FIG. 12 is a cross-sectional view showing a field to be cultivated.
Figure 13:
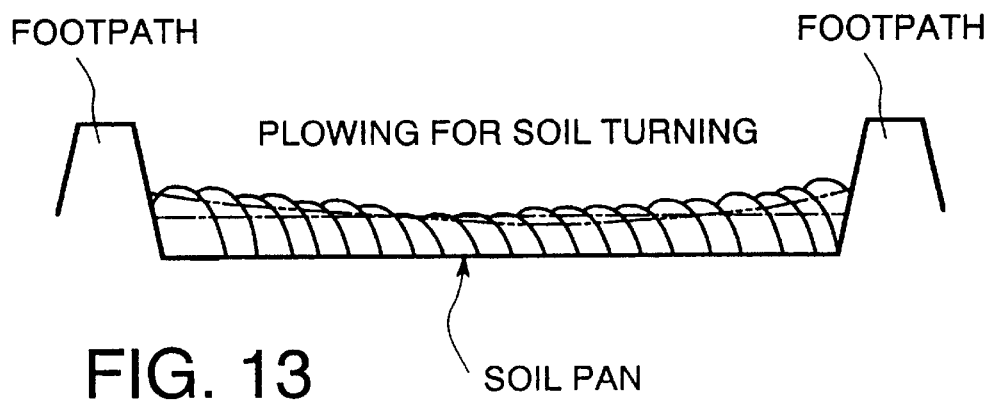
FIG. 13 is a cross-sectional view showing a cultivation target field after soil turning.

First, a plowing work for soil turning is performed on a paddy field to be cultivated (FIG. 12) by using the bottom cultivating machine 10 (FIG. 13). In this case, according to the bottom cultivating machine 10, the soil pad S of the field can be flattened horizontally at all times. Therefore, even when the surface of the field is heated up like a footpath, it will be flattened by a subsequent work. Since the importance of the leveling work for the soil pad S is described in the "Description of Related Art", the description thereof is omitted from the following description. However, the leveling work is the most important feature of the cultivating machine of the present invention. With the leveling work, a paddy field having an uniform environment can be provided, so that crops can be uniformly grown.

Figure 14:
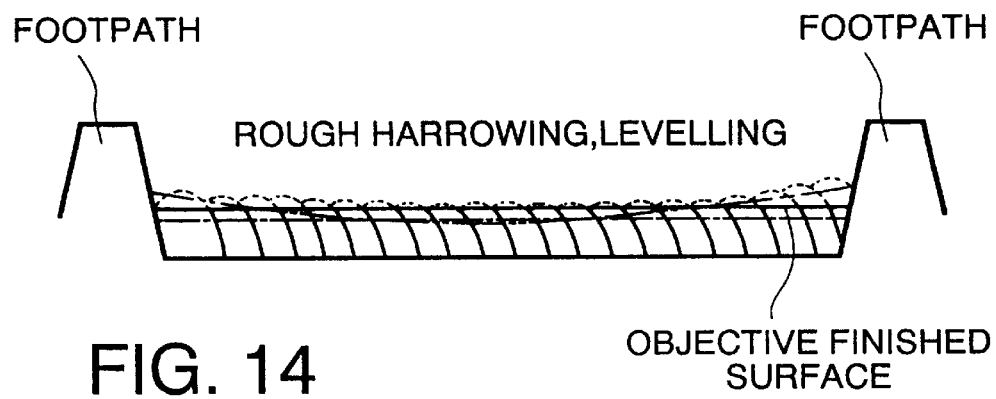
FIG. 14 is a cross-sectional view of a cultivation target field after rough harrowing and leveling.

Further, the leveling work for leveling the surface of the paddy field continuously is performed while performing the harrowing and packing work are performed at the same time (FIG. 14).

Figure 15:
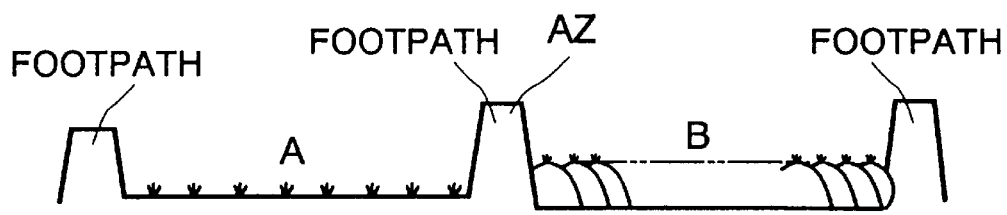
FIG. 15 is a cross-sectional view showing a cultivation target field.
Figure 16:
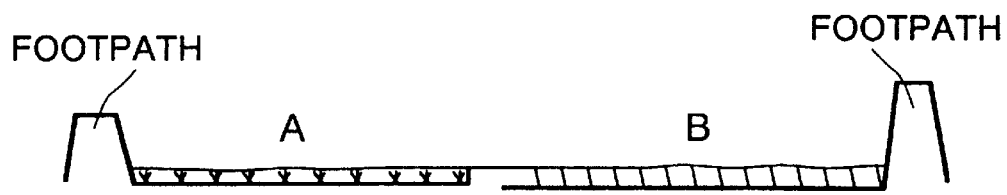
FIG. 16 is a cross-sectional view of two fields when a footpath therebetween is removed.

In a paddy field (FIG. 15), two fields A and B which are located at different height from the ground are unified into one field for the purpose of the enlargement of the scale of the fields. In the paddy field, a footpath AZ is located at an intermediate portion between the fields. When the footpath AZ is removed to enlarge the scale of the paddy field, the footpath AZ is first removed, and the field B is plowed for soil turning. At this time, the plowing depth of the field B is set to a value larger than that of the field A (FIG. 16).

Figure 17:
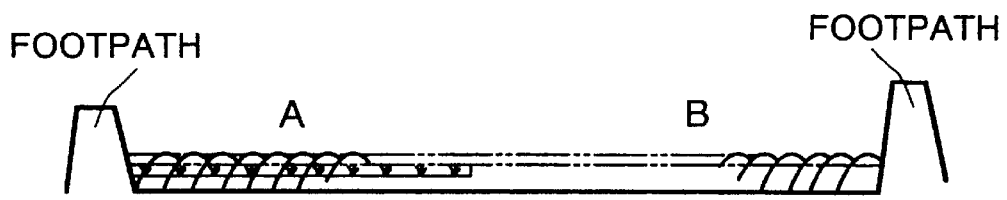
FIG. 17 is a cross-sectional view of two fields.

Subsequently, the soil of a lower-layer portion which is placed faceup by the plowing work is dried, and then the upper portion of the dried soil is fed to the field A and roughly prepared while being roughly harrowed (FIG. 17). In this state, the surfaces of the fields A and B are located at the same height.

Figure 18:
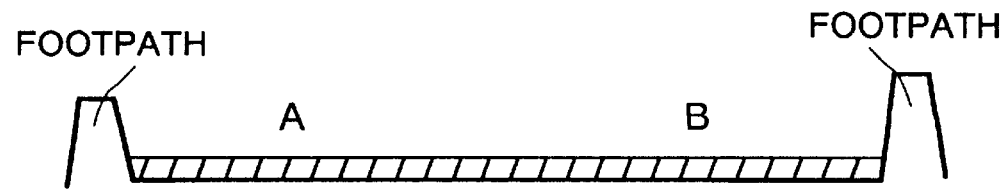
FIG. 18 is a cross-sectional view showing a state where two fields are roughly harrowed and leveled.

Furthermore, the plowing for soil turning is performed by the bottom cultivating machine so that the soil pads S of both the fields A and B are commonly flattened (FIG. 18), and then a finishing work is performed by using the leveling machine of the present invention so that the surface of the whole field is leveled.

Figure 19:
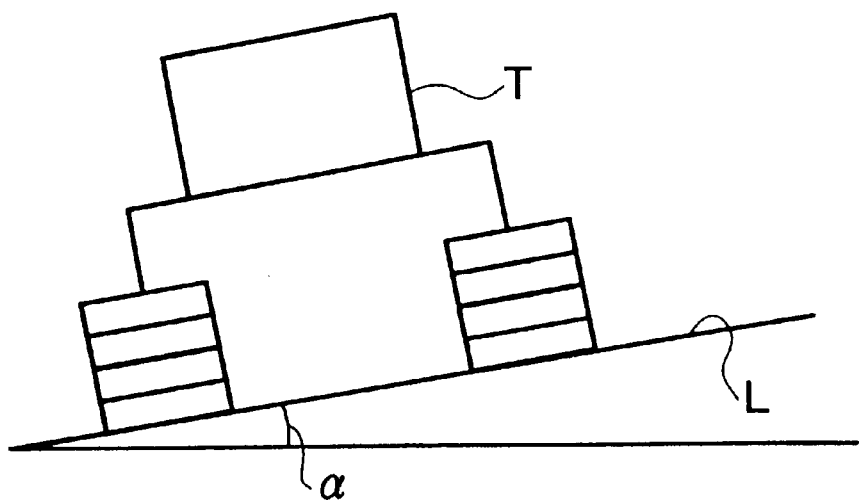
FIG. 19 is a back side view showing a tractor under a cultivating state when a conventional cultivating machine is used
Figure 20:
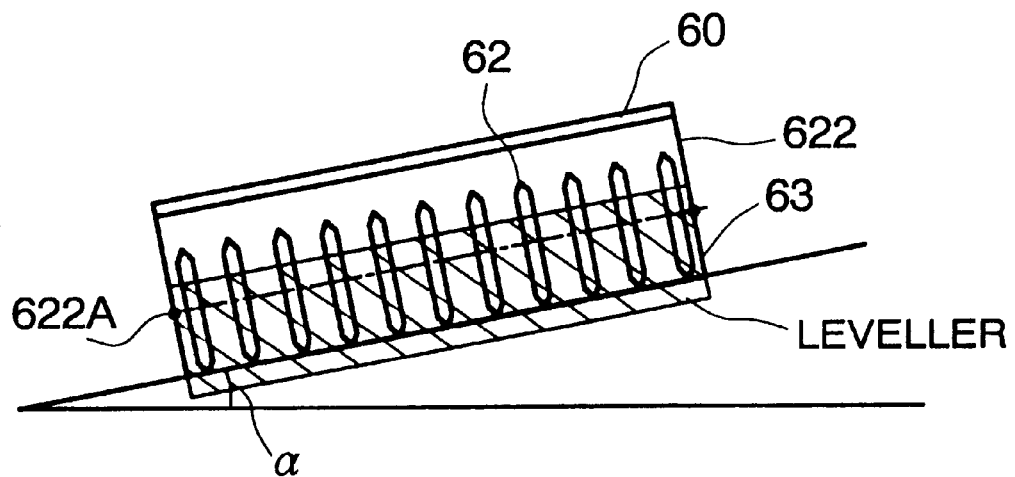
FIG. 20 is a back side view showing a leveling machine under a working state when a conventional cultivating machine is used.

FIGS. 19 and 20 show an actual leveling work using a conventional leveling machine K, and the same parts as the embodiment of the present invention are represented by the same reference numerals.

According to the conventional leveling machine K, when the field surface L is slanted to the absolute horizontal plane by α, the attitude of the tractor is inclined, so that the leveling machine K is necessarily inclined by θ. Therefore, it is necessary to repetitively perform the leveling work at four or five times. This is caused by the fact that the harrowing machine 62 is fixed to the frame. Accordingly, the leveler 63 performs the leveling work while inclined by α, so that the leveling work must be carried out repetitively.

Figure 21:
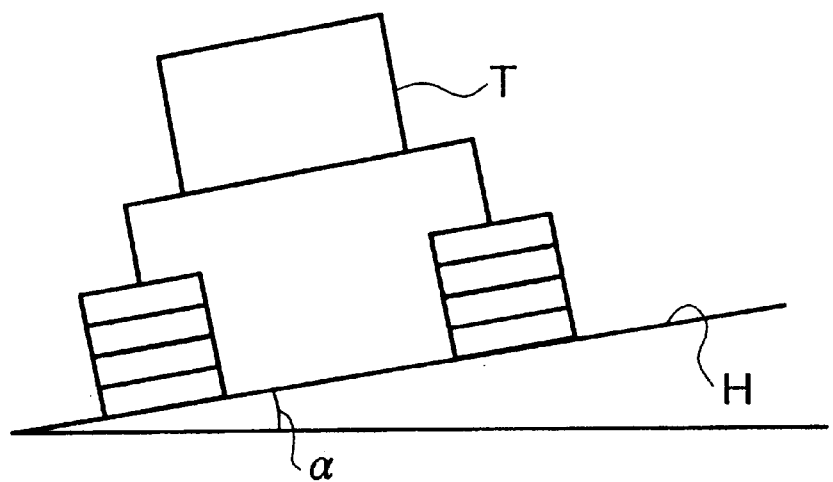
FIG. 21 is a back side view of a tractor under a cultivating machine when the cultivating machine of the present invention is used.
Figure 22:
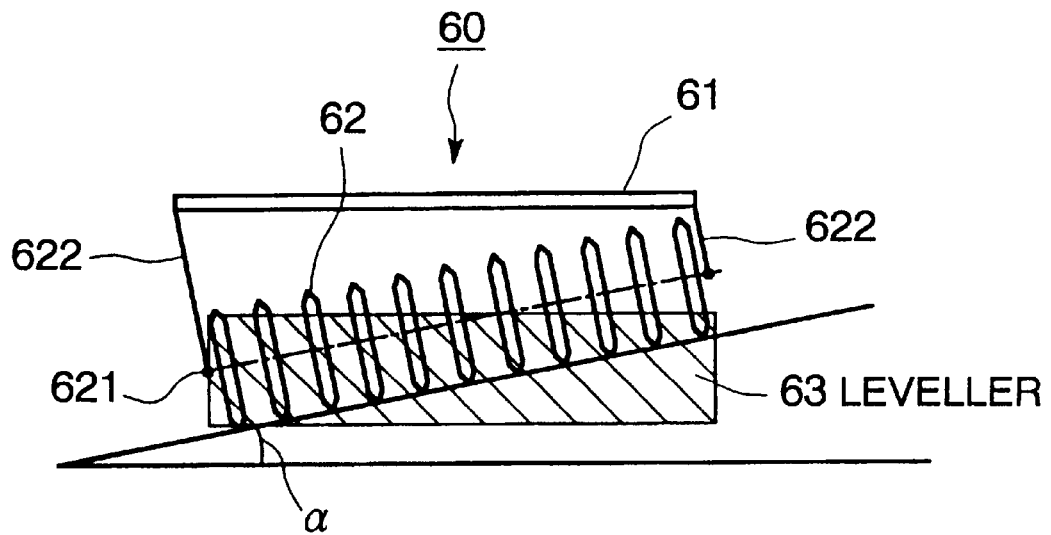
FIG. 22 is a back side view showing a leveling machine under a working state when the cultivating machine of the present invention is used.
Figure 23:
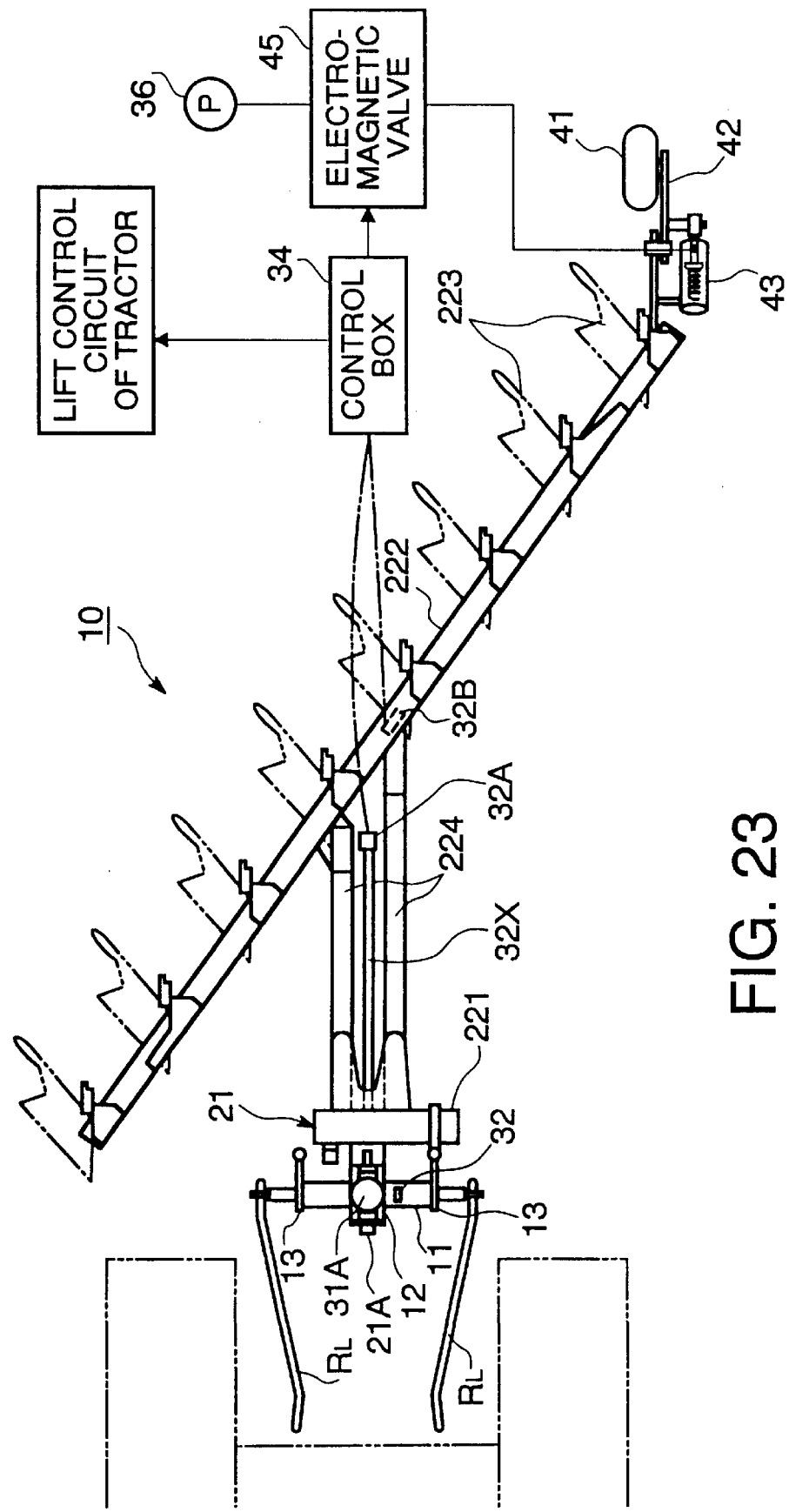
FIG. 23 is a plan view showing a bottom cultivating machine of another embodiment.
Figure 24:
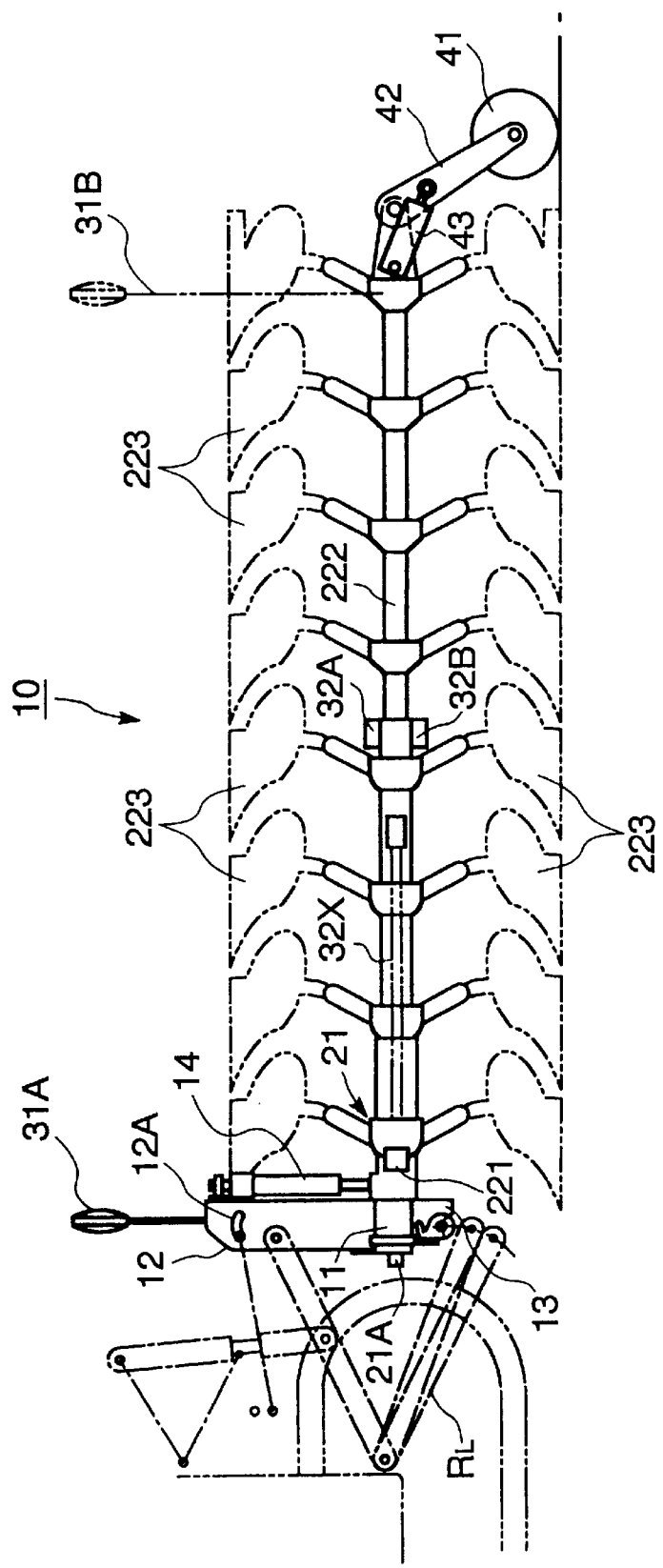
FIG. 24 is a side view showing the bottom cultivating machine of another embodiment.
Figure 25:
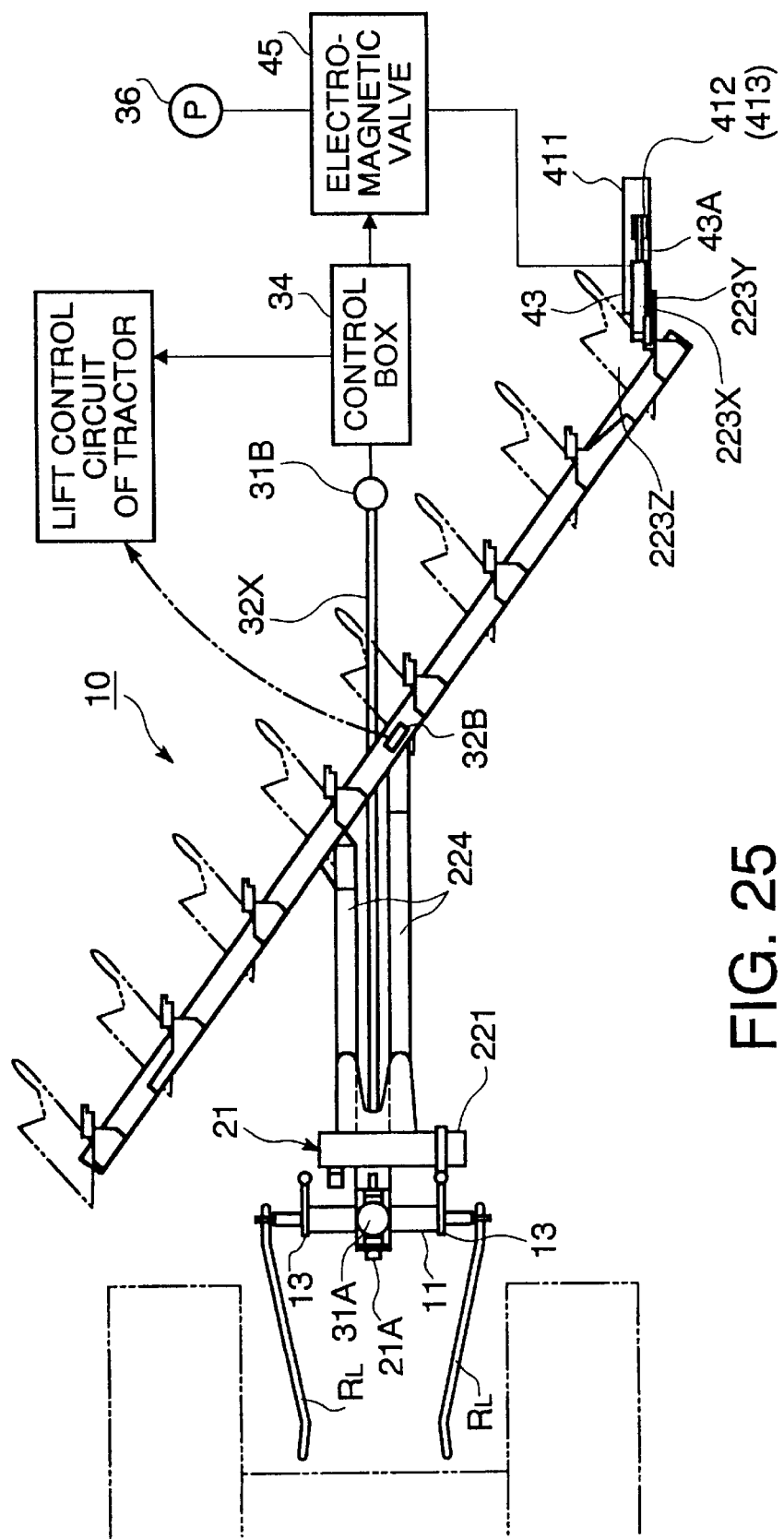
FIG. 25 is a plan view showing the bottom cultivating machine of another embodiment.
Figure 26:
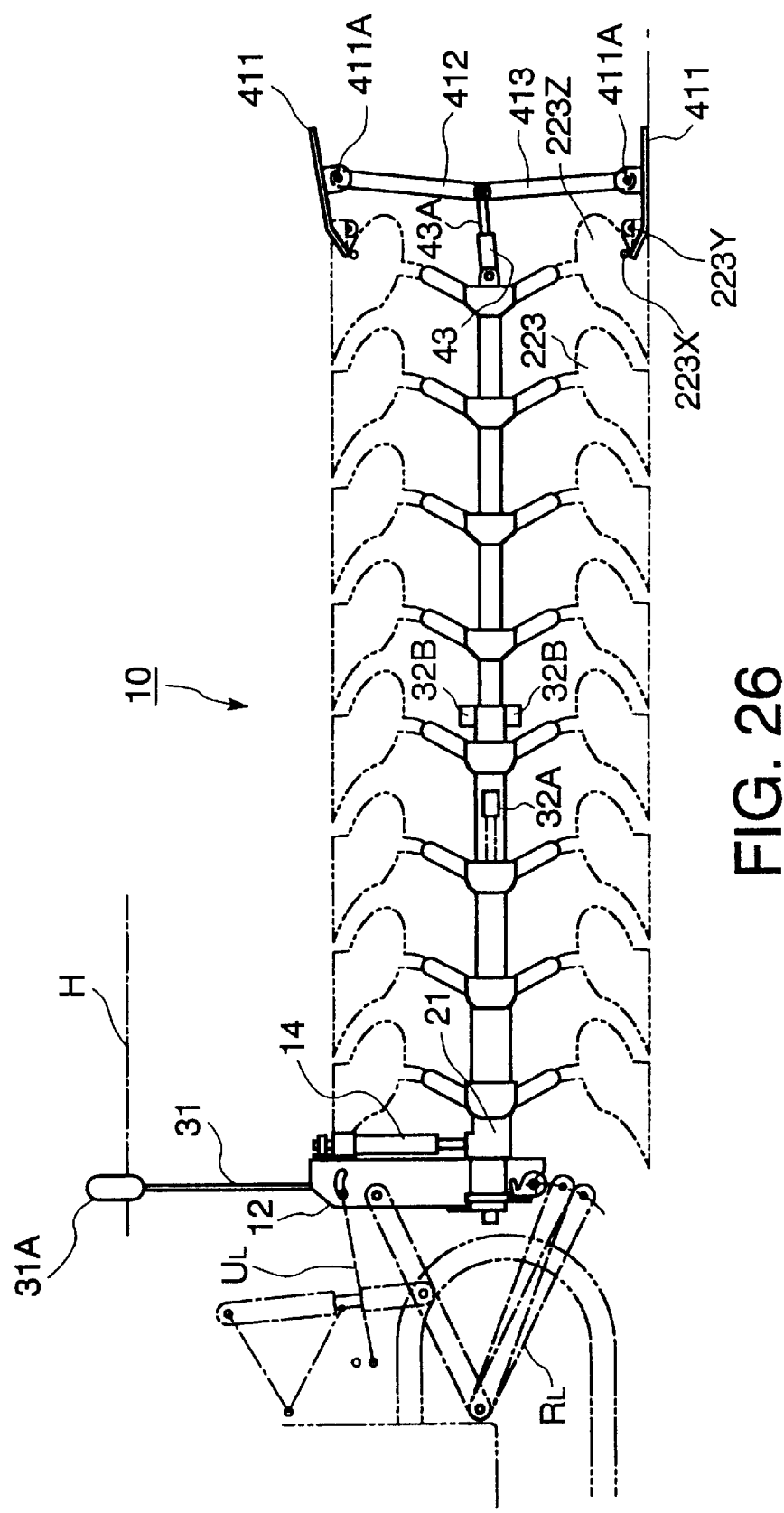
FIG. 26 is a side view of the bottom cultivating machine of another embodiment.
Figure 27:
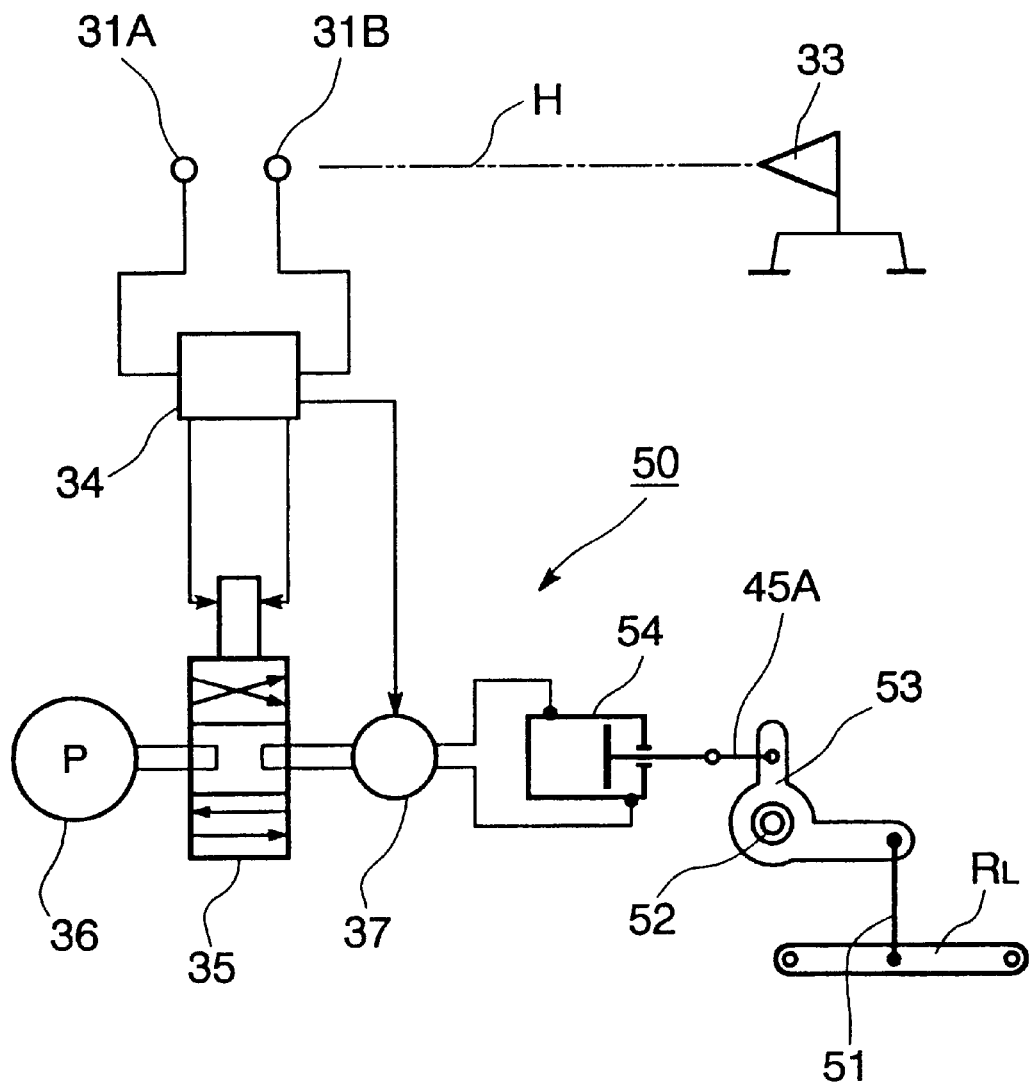
FIG. 27 is a diagram showing a lift mechanism of the tractor.
Figure 28:
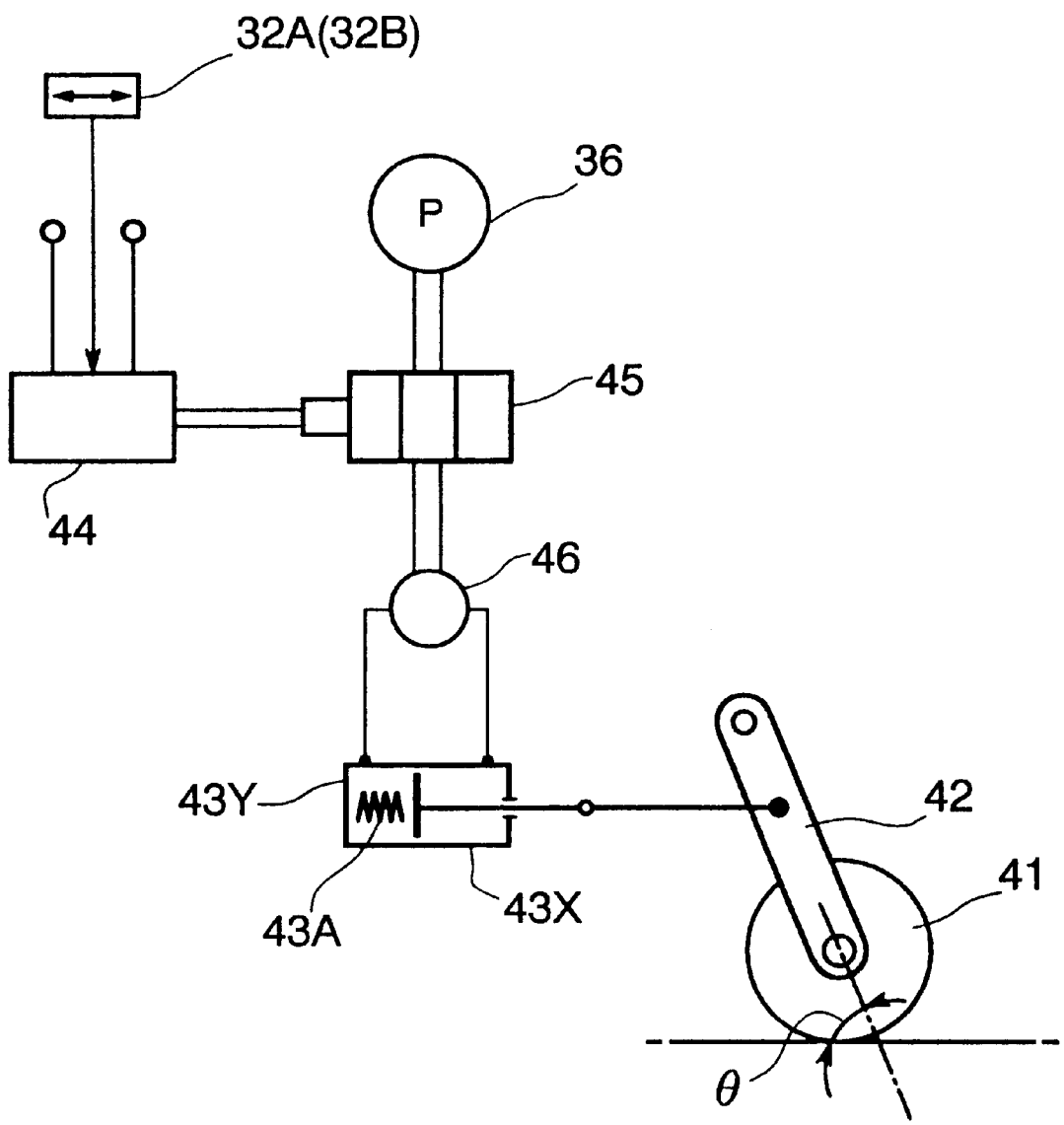
FIG. 28 is a diagram showing a control mechanism for a gage wheel, etc.

On the other hand, according to the leveling machine 60 of the present invention, as shown in FIGS. 21 and 22, the harrowing machine 62 is mounted on the frame 61 so that both the end portions of the center axis 622A of the support shaft thereof are upwardly and downwardly moved by the arm 622. Therefore, the harrowing machine 62 can perform the harrowing work while it is kept in a horizontal position without being dependent on the attitude of the frame 61, and the leveler 63 can also perform the scrapping work at an angle smaller than θ. Accordingly, the surface of the field can be leveled by performing the leveling work about twice.

Figure 35:
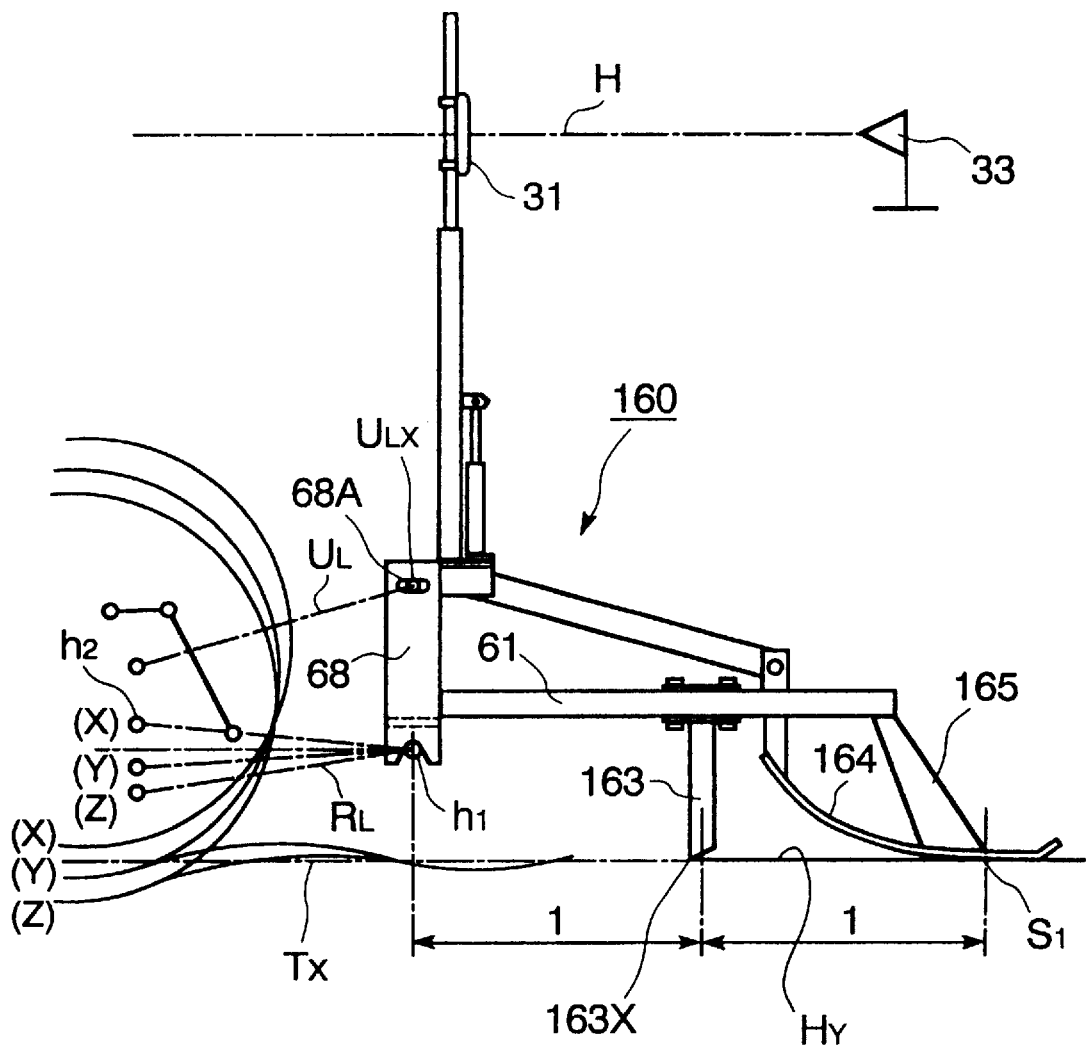
FIG. 35 is a side view showing a rake machine serving as another work function machine of a leveler.

In the foregoing description, the leveler 63 may be replaced by another work machine which is designed to meet another application. Specifically, as shown in FIG. 35, a comb-shaped rake 163 may be used in place of the leveling machine. A warp member 164 is secured to the rear side of the rake 163 which is secured to the frame 61. A support leg 165 is provided between the frame 61 and the warp member 164 to suppress the reaction applied to the warp member 164. The warp member 164 has the function of a fulcrum member, and has the function as a repressing machine in the leveling hybrid cultivating machine.

The rake 163 has a ground-contact point 163X at an intermediate position (substantially at the center position) between the hitch point hi of the lower link RL and the ground-contact point S1 of the warp member 164, and its securing position is identical to that of the leveler as described above.

A mount pin ULX (mount point) of the upper link UL in the mast 68 is not fixed to the mast 68. The mask 68 is formed with an elongated hole 68A (a free zone in which the mount pin is freely movable) along the cultivation progress direction, and the mount pin ULX is mounted on the mask 68 through the elongated hole 68A to secure the upper link UL. In other words, the mount pin ULX is allowed to be freely movable within the length of the elongated hole 68A in connection with the attitude of the cultivating machine.

As described above, the upper link UL of the tractor T is mounted on the cultivating machine 60 through the elongated hole 68A as described above, and the lower link RL of the tractor T is hitched at both side positions (hitch point h1) below the mast 68 in FIG. 35. The lower link RL is controlled to be upwardly and downwardly moved by the lift rod 51 of the lift mechanism of the tractor T as shown in FIG. 5.

Figure 31:
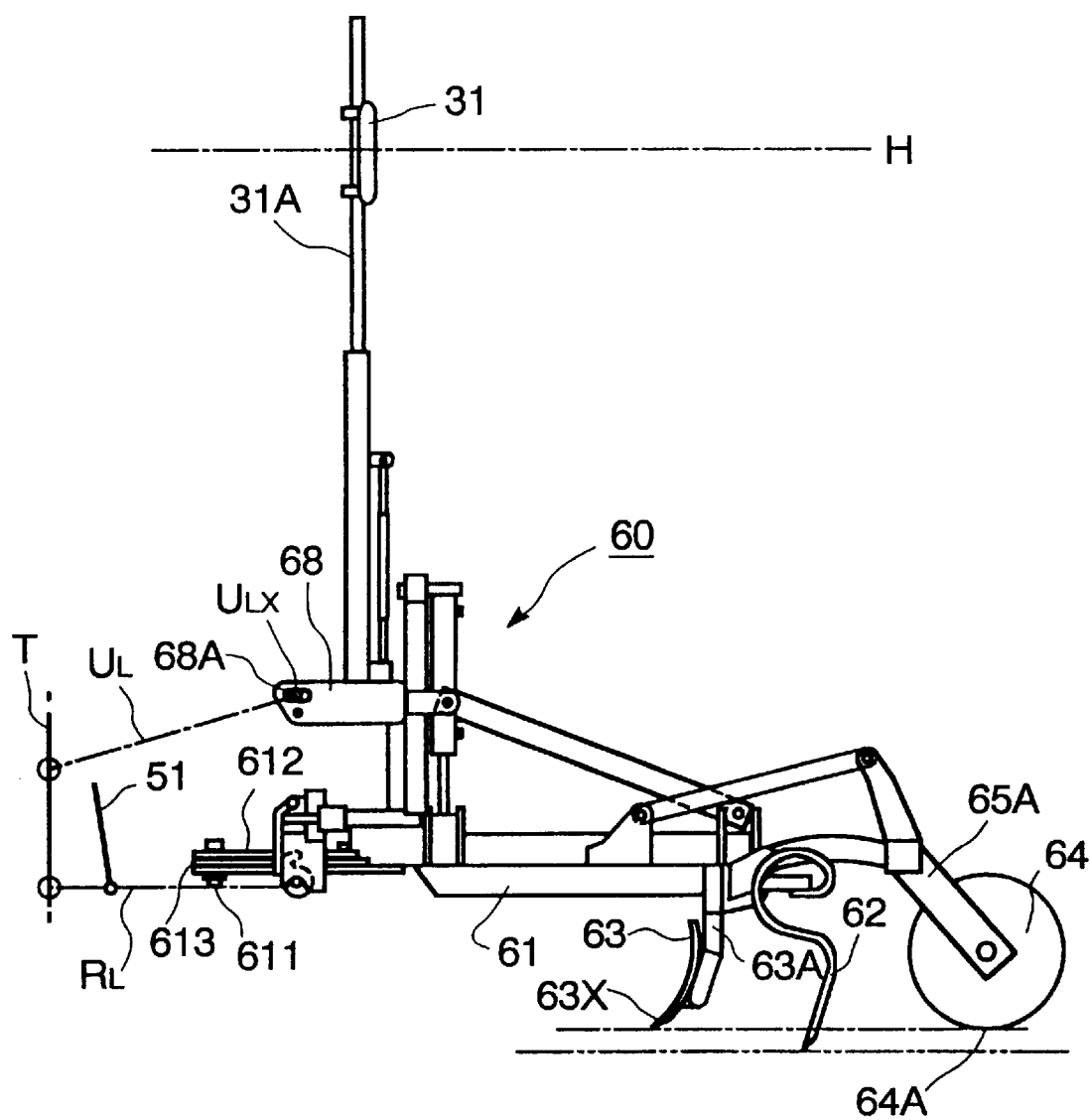
FIG. 31 is a side view showing another embodiment of the present invention.
Figure 32:
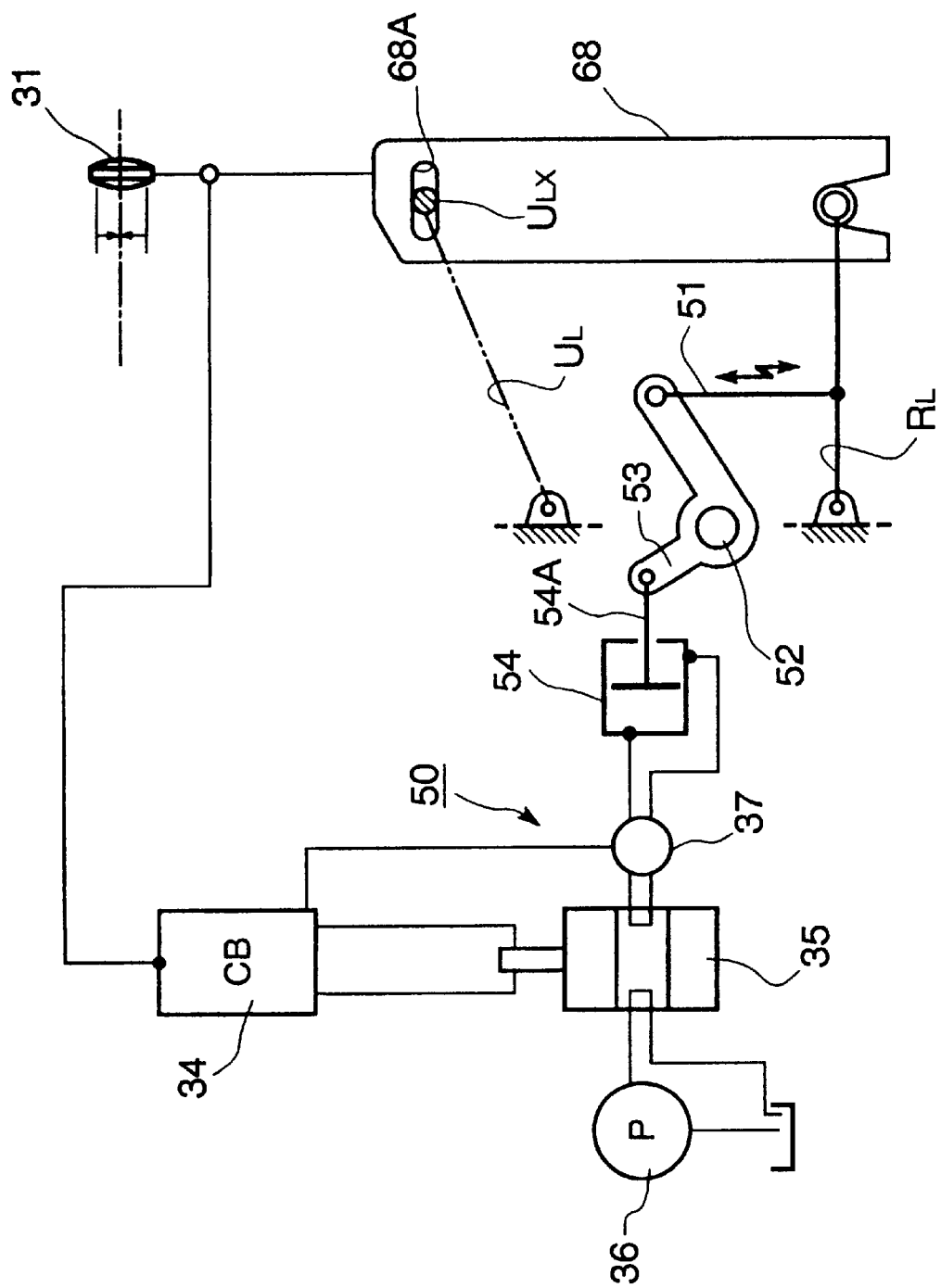
FIG. 32 is a diagram showing the positional relationship between an upper link, an elongated hole and a lift mechanism.

Next, a leveling work of a field by using the leveling machine 60 shown in FIG. 31 will be described.

Since the tractor T (in the figure, a rear wheel is shown) runs along the uneven surface of the field, the tractor T is moved while repeating its upward and downward motion (FIG. 34) in the case where a rake of FIG. 35 is used as the cultivating function machine). That is, when the tractor runs along the uneven curve Tx existing on the field (tires move), the tires themselves are moved upwardly and downwardly. For example, when the tires are shifted to a position of X,Y,Z (X represents a higher position, Y represents an average position and Z represents a lower position), the securing position h2 at the tractor T side of the lower link RL is varied to X, y, Z, however, the hitch point h1 is not varied. After the rake has passed, a linear plane like Hy is formed.

Specifically, the hitch point h1 of the lower link RL is controlled to be kept at a fixed height. For example, when the leveler 63 (rake 163) is located at a projection on the uneven surface which exists in the field F, the laser detector 31 is located at the upper side of the reference plane, in other words, the laser detector 31 is projected to the upper side of the reference plane which is drawn by the laser beam. If the laser detector 31 is out of the reference plane H, a control signal is transmitted from a control box 34 to the lift mechanism 50, and the hydraulic circuit is switched in response to the control signal. That is, a signal for instructing the laser detector 31 to return to the reference plane H is output, and the change-over valve 35 is switched to expand the lift cylinder 54.

At this time, the pressure oil is applied so as to expand the rod 54A of the lift cylinder 54 so that the front end portion of the cultivating machine 60 is pushed down. Accordingly, the lift arm 53 is rotated to push the lift rod 51, and the lower link RL is downwardly moved, so that the front end portion of the M cultivating machine 60 is lowered so that the laser detector 31 is located on the reference plane H.

In order to make the understanding clear, there is considered such a situation that no elongated hole 68A (free zone) exists in the mast 68. When the tractor runs on the field having an uneven surface, the tractor is necessarily moved upwardly and downwardly. The upward and downward motion is transmitted to the cultivating machine mounted on the tractor, and the laser detector 31 is also moved upwardly and downwardly. By the upward and downward motion of the laser detector 31, the control circuit is operated so that the laser detector is located within the reference plane, and thus it controls the cultivating machine so that the hitch point of the lower link is located at a predetermined height with respect to the reference plane. That is, the upward and downward motion due to the travel of the tractor is directly transmitted to the cultivating machine, and in an extreme case the cultivating machine may be lifted up. In this case, an uneven surface which is different merely in phase from the uneven surface of the field is formed on the field, and thus a desired object cannot be achieved.

However, since the mount point of the upper link UL and the mast 68 is designed like an elongated hole, the control amount of the actual upward and downward motion of the tractor is not directly transmitted to the cultivating machine, and it is transmitted in both the upward and downward directions while reduced. In other words, since the leveling machine serving as the work function machine exists at the intermediate position between the hitch point of the lower link RL and the fulcrum member, the upward and downward motion control of the tractor is transmitted as an upward and downward motion of the leveling machine having the fulcrum member as a fulcrum, so that the upward and downward motion is transmitted while reduced by the principle of leverage.

In other words, when the laser detector 31 is out of the plane which is determined by the plane signal H of the laser emitter 33 and thus the height of the cultivating machine 60 is varied, a displacement amount by which the laser detector 31 is displaced from the reference plane is calculated by the control box 34 to calculate a control amount, and then a signal corresponding to a correction value of the control amount is input to the hydraulic circuit of the lift mechanism 50 of the tractor, whereby the driving of the lower link is controlled through the lift rod 51. Accordingly, the attitude of the cultivating machine is controlled so that the laser detector 31 is located within the horizontal plane as described above.

Figure 36:
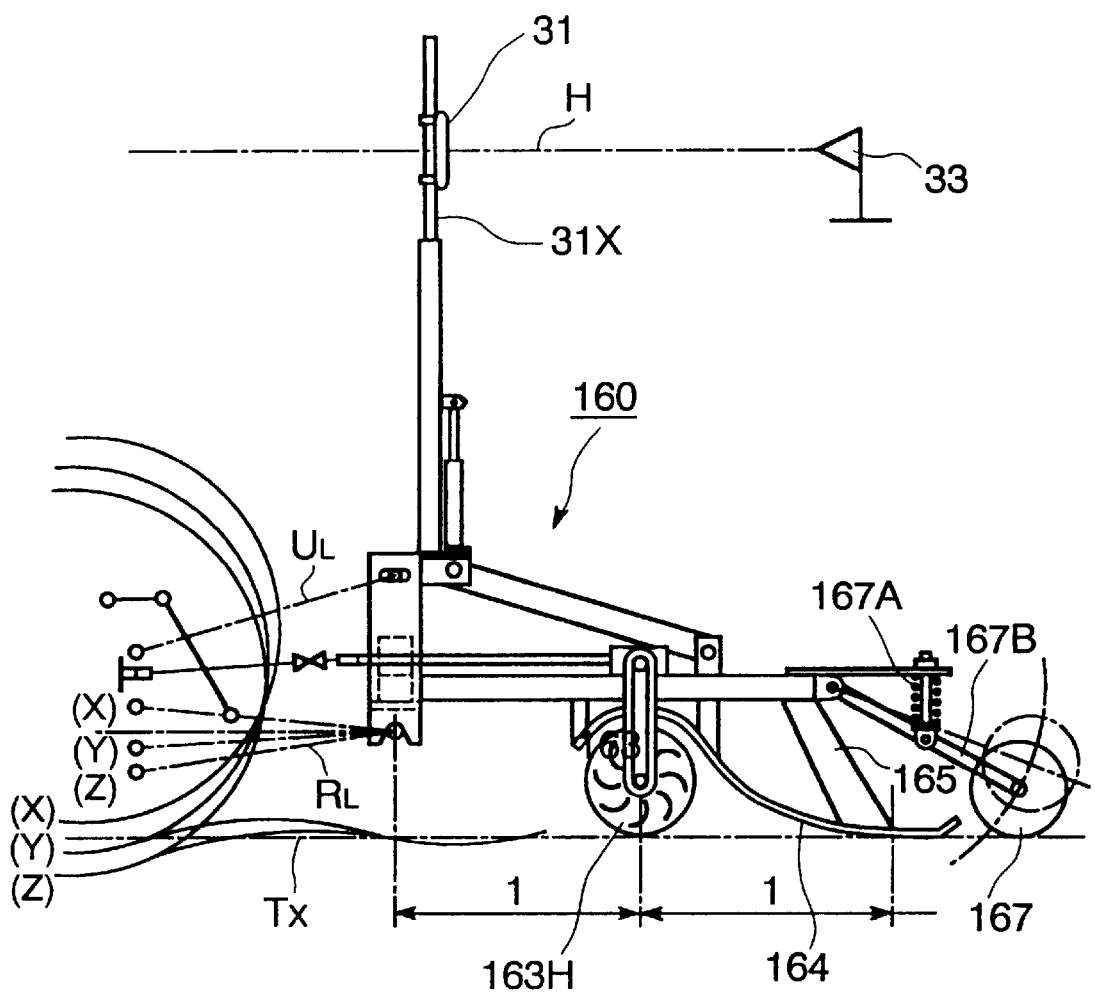
FIG. 36 is a side view showing a cultivating machine which shows a hallow as a work function machine.

In addition to the leveling machine as described above, a rotary hallow, a paddy hallow 163, etc. are used as shown in FIG. 36. Further, a ground-contact wheel 167 which is urged in the ground-contact direction at all times is provided at the rear side of the warp member 165. Since the ground-contact wheel 167 is pushed by a spring 167A, the spring is deformed by the reaction and thus it cannot act as a fulcrum member. In this case, the warp member acts as a fulcrum member for the cultivation function machine.

As the cultivation function machine may be used a beam standard 163S of a sub soiler cultivating machine which is called as "knife", and a tail wheel 167Y which is provided with a height adjusting function is used as the fulcrum member.

Figure 33A:
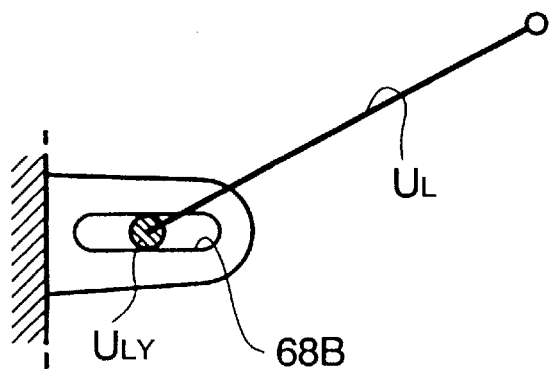
FIGS. 33A, 33B and 33C are diagrams showing other embodiments which can be substituted for the elongated hole in FIG. 32.

Each of these cultivating machines is provided with the mast 68, and the mount pin ULX of the upper link UL is mounted through the elongated hole 68A formed in the mast 68. In this case, a displacement amount of the laser detector from the reference plane is detected to operate the lift mechanism, so that the mount pin ULX is freely movable in the range of the elongated hole 68A. However, as shown in FIG. 33C, the upper link UL may be provided with an expansion mechanism. In this case, the motion distance corresponding to the movement of the mount pin ULX is achieved by the expansion of the upper link itself.

Figure 33B:
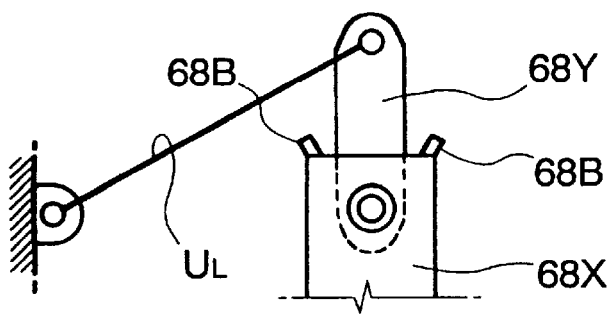
Figure 33C:
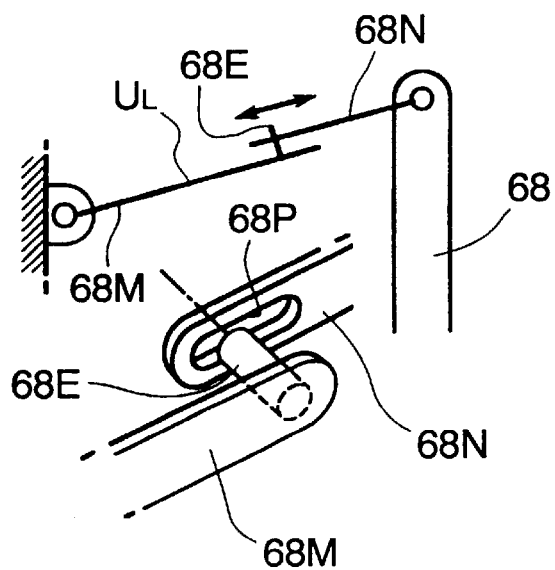

Furthermore, as shown in FIG. 33B, it may be adopted that a movable mast 68Y is pivotally mounted at the top portion of the mast 68, and the upper link UL is secured to the movable mast 68Y. In this case, the movement of the upper link UL is detected on the basis of variation of inclination of the movable mast 68Y to detect the attitude of the cultivating machine.

Still furthermore, as shown in FIG. 33A, the upper link UL may be secured to the elongated hole 68B through the pivot pin ULY at the securing point of the upper link UL at the treactor side to detect the attitude of the cultivating machine.

Figure 34:
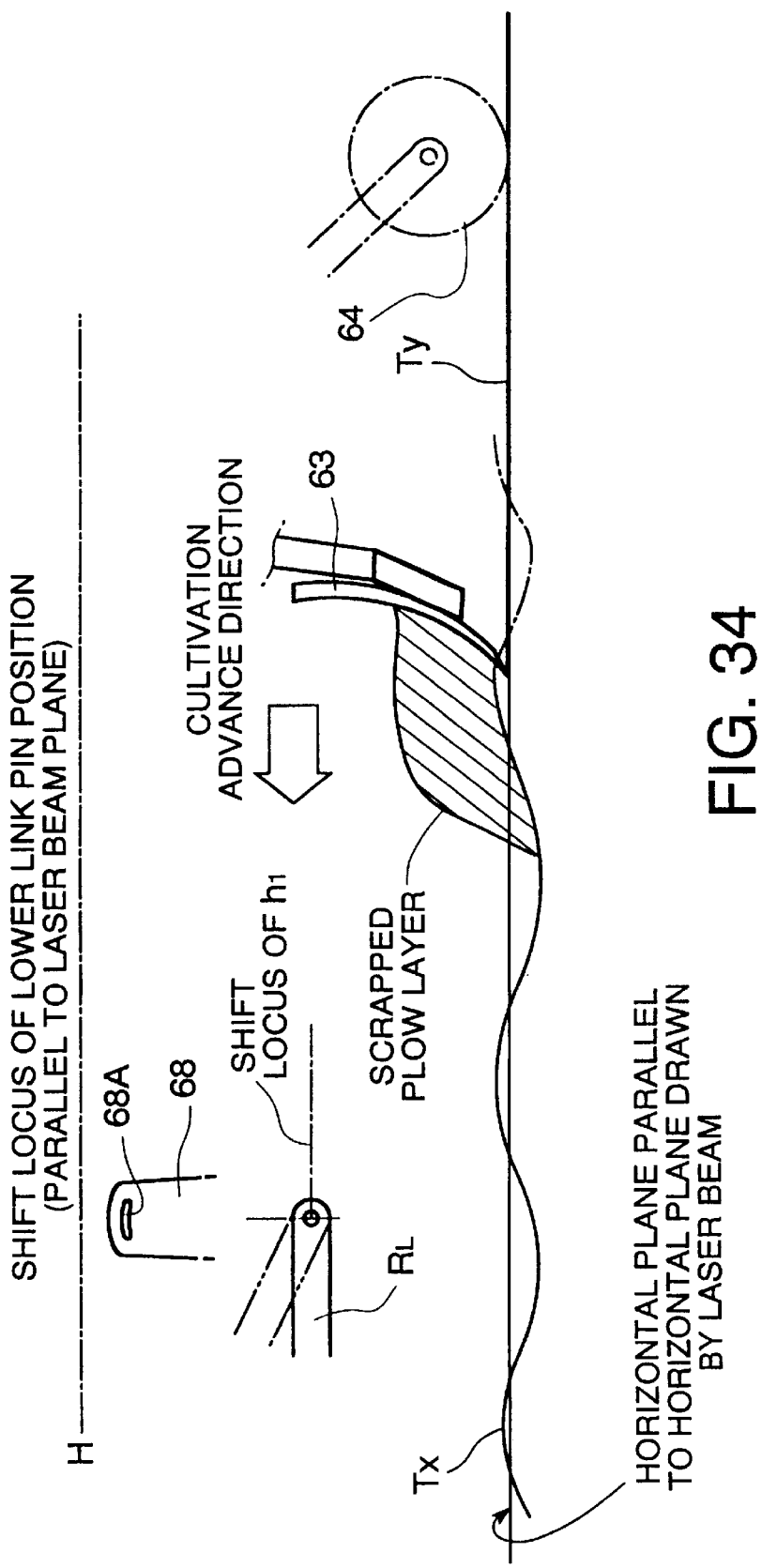
FIG. 34 is a diagram showing a leveling work state in a field.

FIGS. 34 shows a situation where the surface of the field is scrapped or plowed by the leveling machine. After the leveler 63 passes over a relatively large uneven surface Tx of the field, a relatively small uneven surface Ty which is parallel to the reference plane H is formed. The small uneven portion Ty of the surface constitutes an average flat plane.

Figure 37:
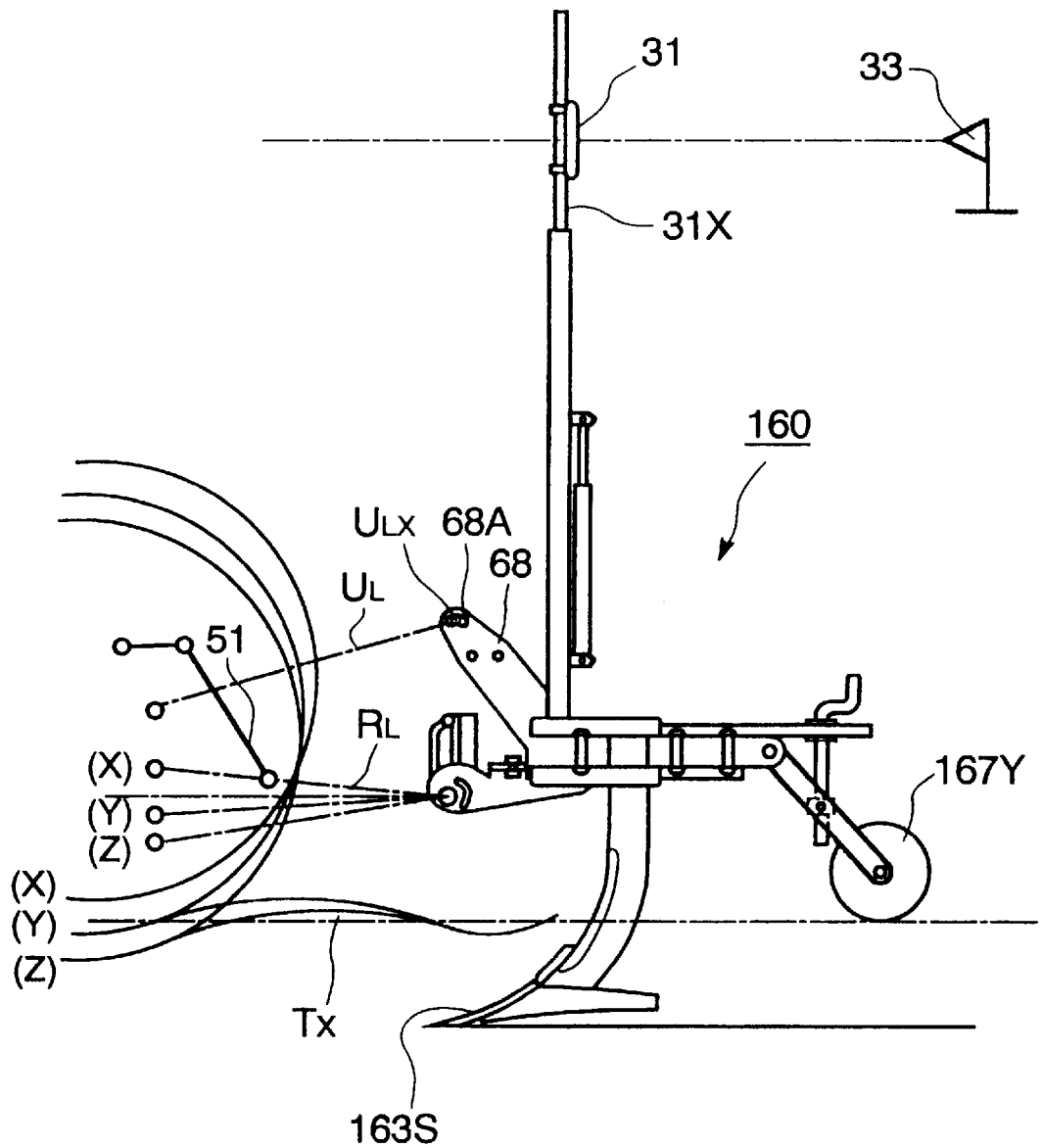
FIG. 37 is a side view showing a cultivating machine which shows a sub-soiler serving as a work function machine.

FIG. 37 shows a case where a sub-soiler machine is applied as a cultivating machine. According to this cultivating machine, the bottom of a ditch which is formed by a chisel 163S has a flat surface which has no unevenness like the plane Hy of the field surface shown in FIG. 36.

In the foregoing description, the three-point hitch mount type cultivating machine is used. Next, a cultivating machine using a linkage draw bar for mount will be described.

Figure 38:
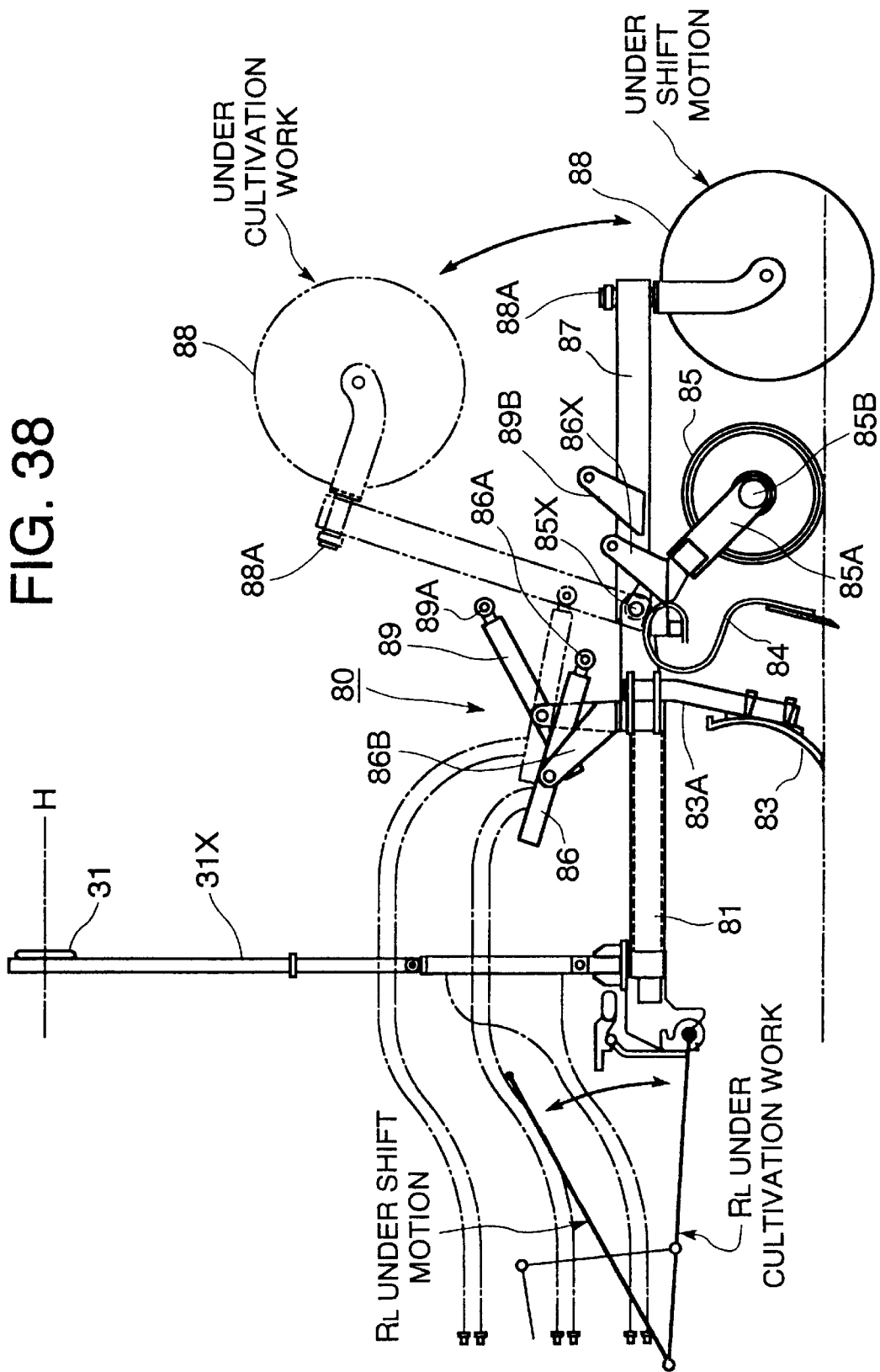
FIG. 38 is a side view showing a leveling machine which has as a work function machine a leveler mounted according to a linkage draw bar system, and also has a caster-type moving wheel.
Figure 39:
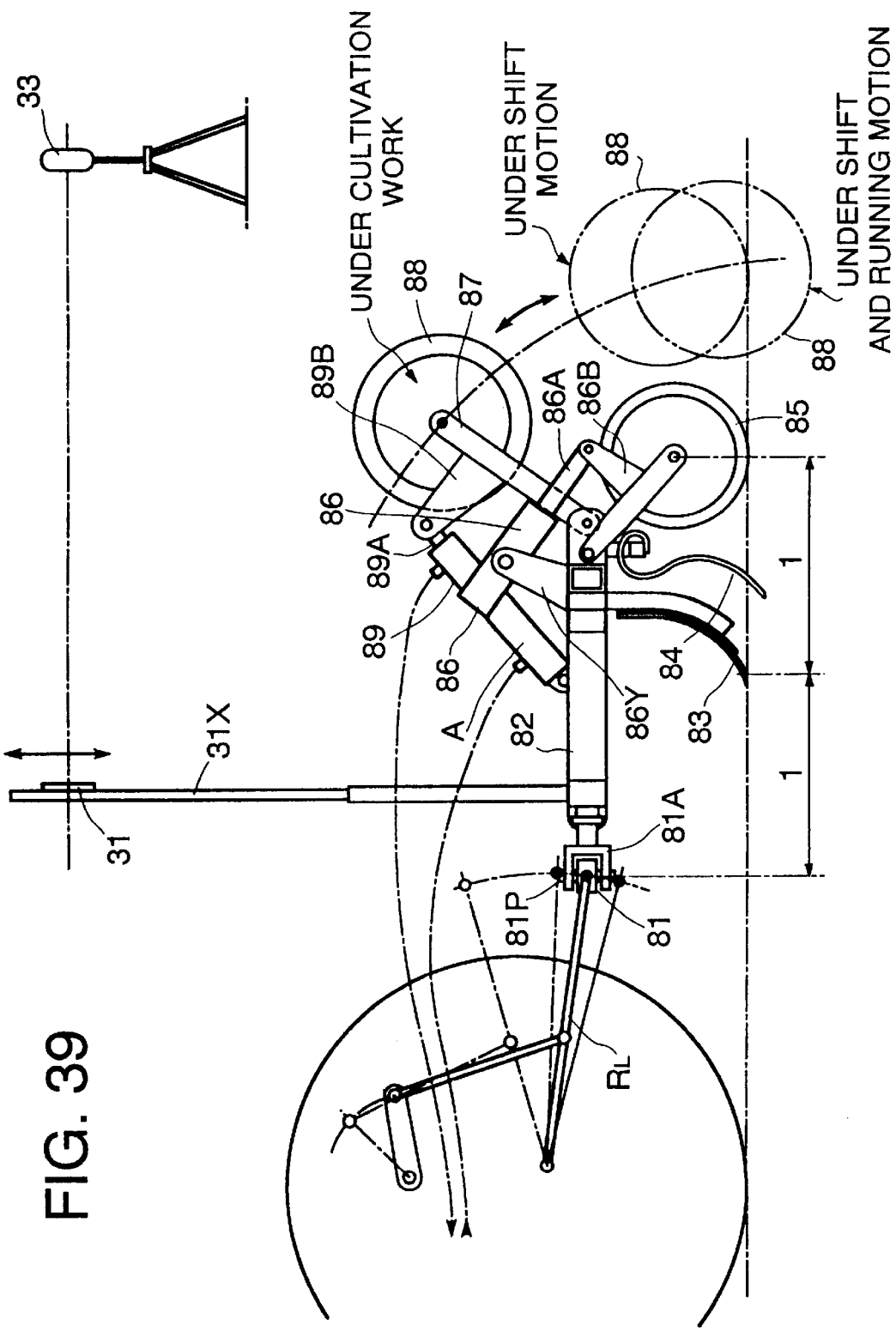
FIG. 39 is a side view showing a leveling machine which is pivotally mounted at a hitch point so as to be rotatable, and has as a work function machine a leveler mounted according to the linkage draw bar system.

FIGS. 38 and 39 show a leveling machine 80. A cross bar 81 is supported by the lower link RL of the tractor T, and the cross bar 81 is secured at the most tip position of the frame 82 constituting the cultivating machine.

In the cultivating machine 80, a pole 31X to which the laser detector 31 stands at the tip portion near to the most front portion on the frame 82, and it serves to detect the positional relationship between the detector 31 and the reference plane H.

Since the cultivating machine 80 serves to perform the leveling work, it has a leveler 83. The leveler 83 is supported by an arm 83A whose end portion is fixed to the frame 82, and secured to the frame 82. A tine 84 is mounted at the rear side of the leveler 83 in the cultivation progress direction. The tine 84 serves to harrow the soil of the surface. The harrowing manner is not limited to the tine 84, and the tine may be replaced by another harrowing machine.

Further, a coil-shaped repressing wheel 85 is provided at the rear end portion of the frame 82. The repressing wheel 85 has a support shaft 85B at the center position thereof, and the support shaft 85B is supported by a free end portion of the arm 85A whose end portion is pivotally supported by the frame 82. The pivot point 85X of the arm 85A allows the arm 85A to rotate freely, and also acts as a fulcrum member of each type cultivating machine. When the leveler 63 is located most nearly to the edge of a footpath, the repressing machine serving as the fulcrum member can lift the leveler 63, and thus the leveling work can be started from the edge of the footpath. In order to perform this work, the repressing wheel 85 serving as the fulcrum is controlled to be lifted up. As a mechanism for lifting up the repressing wheel 85, a mount seat 86B of the rod 86A of the hydraulic cylinder 86 is formed at the intermediate position of the arm 85a, and the rod 86X of the hydraulic cylinder 86 is mounted on the mount seat 86B, whereby the intermediate portion of the hydraulic cylinder 86 is pivotally mounted on a support arm 86Y which is erected from the frame 82, thereby allowing the hydraulic cylinder to be freely expanded and contracted.

At the most rear side of the cultivating machine 80, two movable wheel arms 87 are pivotally mounted in the cultivation width direction so as to be elongated in the cultivation progress direction. The movable wheel arms 87 have the pivot points on the same axial line as the pivot point 85X. A caster type movable wheel 88 is secured through a caster wheel 88A to the open end portion of each movable wheel arm 87 so that the movable wheel 88 is freely rotatable along the moving direction of the tractor.

The movable wheel arm 87 is provided with an arm 89B at the intermediate position thereof, and a rod 89A of a hydraulic cylinder 89 is pivotally mounted on the arm 89B. Through the expansion and contraction motion of the rod 89A of the hydraulic cylinder 89, the movable wheel arm 87 is rotated within the vertical plane to bring the movable wheel 88 into contact with the ground or lift up the movable wheel 88. During the cultivation, the movable wheel 88 is kept away from the surface of the field by the contraction of the rod 89A of the hydraulic cylinder 89 as shown by a broken line of FIG. 38, and the leveler 83, the tine 84 and the repressing wheel 85 serving as the fulcrum member are located on the surface of the field.

The cultivating machine of this embodiment can be mounted on the tractor without using the upper link. Accordingly, unlike the cultivating machine of the preceding embodiment, it is unnecessary to consider the free mobility of the upper link. The movement of the mount point ULX of the upper link UL is not limited to the range of the elongated hole 68X, and it is freely movable. Accordingly, although the leveling machine 80 is upwardly or downwardly moved in accordance with the displacement degree of the laser detector 31 from the reference plane during the leveling work, the repressing machine 85 serving as the fulcrum member is upwardly or downwardly moved as the fulcrum member, so that the leveler 83 is upwardly or downwardly moved in a smaller range than the actual upward and downward movement control amount of the lower link RL.

Further, if the laser detector 31 is out of the reference plane H, the lift mechanism of the tractor is operated to control the attitude of the leveling machine through the lower link. RL. In this case, the same hydraulic mechanism of the lift mechanism is used, and the control thereof is the same as the cultivating machine as described above.

When the cultivating machine 80 is shifted from a field to another field (during an inter-field shift work), this embodiment is particularly effectively used for a large-size cultivating machine which cannot be lifted up by only the lift action on the lower link RL. In this case, the movable wheel is forcedly brought into contact with the ground. That is, the hydraulic cylinder 89 is expanded, and the movable wheel arm 87 is clockwisely rotated in FIG. 38 to bring the movable wheel 88 into contact with the surface of the field, thereby floating the leveler. This state is kept by the lock operation of the hydraulic circuit, and the cultivating machine is hauled by the tractor. At this time, the front end portion of the cultivating machine 80 is lifted up by the lift mechanism of the tractor.

This system is more suitable for a leveling machine having a large working width, that is, a large-scale leveling machine, and it is preferably applied to a heavy cultivating machine which is beyond the lift power of the tractor. Further, since the movable wheel 88 is of a caster type, it can surely follow the steering of the tractor when it runs on the road, and it can be easily steered at a corner.

Figure 40:
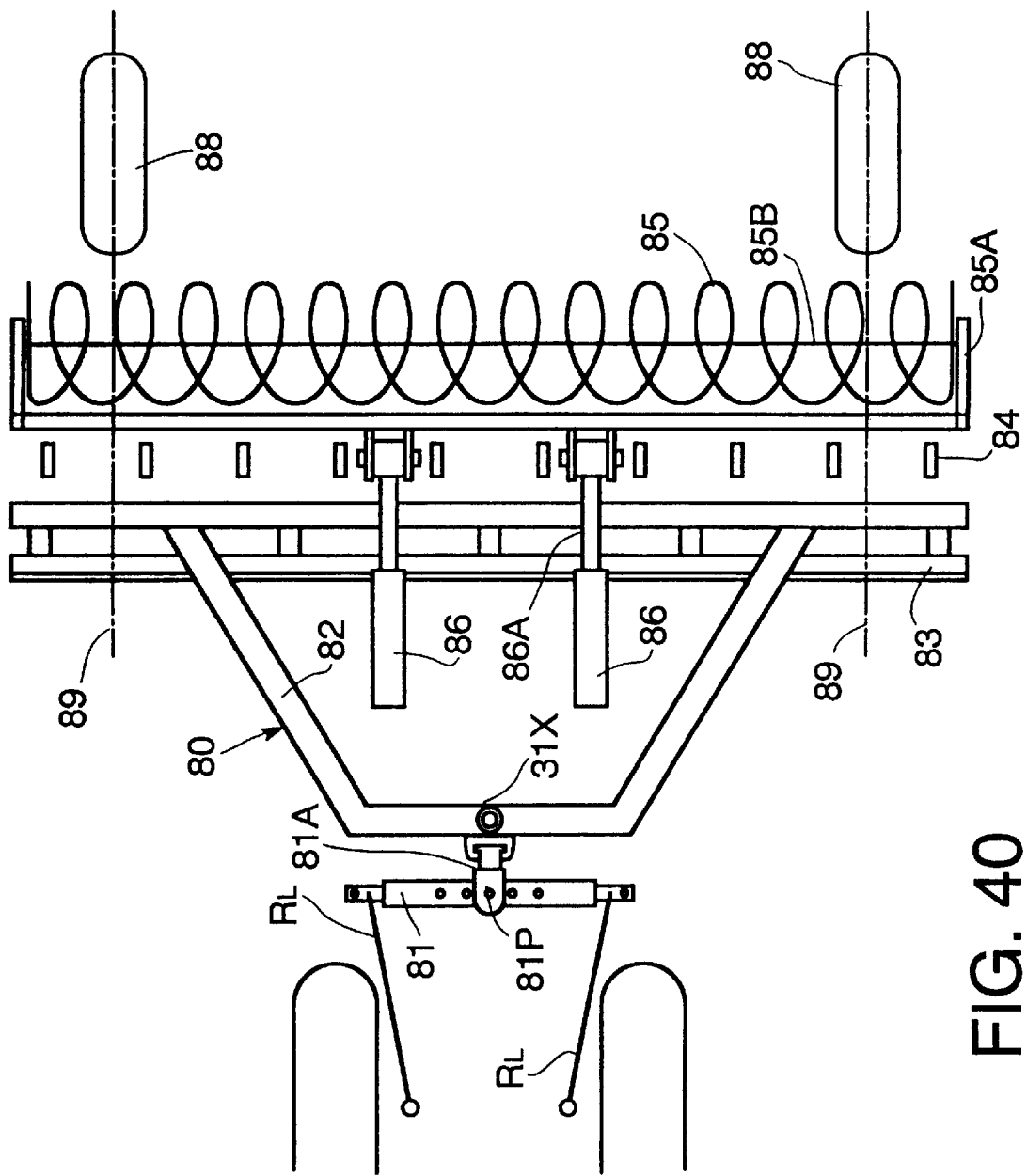
FIG. 40 is a plan view showing the leveling machine shown in FIG. 39.

Further, even when the leveling machine adopts a hauling mechanism using a linkage draw bar, the hitch of the cultivating machine may be pivotally mounted on the cross bar 81 at one point, whereby it can run while drawing a arcuate line independently of the tractor as show in FIGS. 39 and 40. That is, a hitch fitting member is secured at the most tip portion of the leveling machine 80, and the hitch fitting member 81A and the cross bar 81 are pivotally secured to each other through a hitch pin 81P at the center position thereof. With this construction, the cross bar 81 is integrally mounted on the tractor, however, the cross bar 81 is allowed to be rotatable relatively to the tractor around the hitch pin 81P. Therefore, in place of the caster type, a tail-wheel type which is suitable to support a heavy cultivating machine may be used as the movable wheel 88.

In this embodiment, the repressing machine 85 functions as a fulcrum member, and the upward and downward motion of the leveler 83 is reduced to a level smaller than the control width of the actual upward and downward motion of the tractor, that is, the upward and downward motion control amount of the lift mechanism of the tractor. In this case, the power for the movable wheel 88 and the lift work of the repressing machine 85 is supplied by the output of a hydraulic power taking machine of the tractor.

As is apparent from the foregoing description, according to the bottom cultivating machine using the cultivating method as described above, the soil can be plowed in the paddy field plowing work while keeping the soil pad to be flat horizontally. Therefore, even when the surface environment of the field is uneven, the paddy field can be finally formed to have an uniform soil layer. Accordingly, the scrapping work can be performed with the minimum load, and crops of high quality are expected to be grown uniformly in all the areas. Therefore, the harvest can be increased, and the cost can be reduced.

Further, particularly in the case of the bottom cultivating machine, the height control can be performed at the front portion and the rear portion, so that the flattening of the soil pad can be easily performed. In addition, the soil which is plowed for soil turning is dried in a short time, and thus the next cultivating work can be started after a short time.

Further, the gage wheel and the heel are shifted along the bottom of the conglomerate which is turned by the bottoms, so that the cultivating machine is shifted horizontally, and the horizontal attitude of the bottom cultivating machine can be kept surely.

Still further, when the cultivating function machine is upwardly and downwardly moved by the lift mechanism of the tractor, there is provided a clearance, so-called a free zone between the mast and the mount point of the upper Link. Therefore, the mount point can be freely moved in a fixed range. Particularly, the fulcrum member at the rear end portion of the cultivating machine is brought into contact with the surface of the field at all times, and thus the cultivating machine can perform the cultivation work while keeping a stable attitude. Therefore, the cultivating machine can be controlled to have an upward and downward motion width which is smaller than the actual upward and downward control width by the lift mechanism of the tractor. Accordingly, even when a large uneven portion exists in the field, the field surface can be finished to have relatively small unevenness (which is dependent on the running speed of the tractor). Therefore, the uniformity of the field condition can be performed.

Further, when the cultivating machine is a sub soiler the bottom of a ditch or the like can be formed along the reference plane.

According to the cultivating machine which is mounted by the linkage draw bar or the hauling method, in the control of the upward and downward motion by using the lift mechanism of the tractor, the cultivating function machine is upwardly and downwardly moved by using the fulcrum member as a fulcrum. Therefore, the cultivating machine can be kept in a stable state, and the upward and downward motion control width of the cultivating machine is reduced to be smaller than the actual upward and downward motion control width of the tractor. Therefore, the surface of the field can be surely finished to be parallel to the reference plane.

Further, even when the cultivating machine is mounted by the linkage draw bar or in the hauling manner, the cultivating machine is controlled to be upwardly and downwardly moved while using the fulcrum member as a fulcrum. Accordingly, the field can be leveled to have a flat surface and also it can be finished to be flat for another working object.

What is claimed is:

1. A bottom cultivating machine comprising:

a laser emitter which is disposed out of a field and emits a plane signal of laser beams;

a laser detector which is secured to a frame having a mast and detects the plane signal emitted from said laser emitter to output an attitude control signal;

horizontal detection means for controlling the attitude of said bottom cultivating machine, said horizontal detection means including a horizontal sensor which is secured to the frame and serves to detect the level of the front end portion of said bottom cultivating machine in a cultivation progress direction; and control means for controlling the height of said bottom cultivating machine on the basis of the attitude control signal and controlling the attitude of said bottom cultivating machine on the basis of a signal output from said horizontal sensor by upwardly or downwardly moving a gage wheel or a heel having the same function as said gage wheel which is provided at the rear portion of said bottom cultivating machine.

2. The bottom cultivating machine as claimed in claim 1, wherein said horizontal detection means includes a detector which is disposed at the front end portion of said bottom cultivating machine at which the variation of the attitude of said bottom cultivating machine is little, and a detector which is disposed at the rear end portion of said bottom cultivating machine so that even when the attitude of said bottom cultivating machine is varied, said detector is not effected by the variation.

3. The bottom cultivating machine as claimed in claim 1, wherein said horizontal detection means includes horizontal sensors which are disposed at the front and rear end portions in the cultivation progression direction of said bottom cultivating machine.

4. The bottom cultivating machine as claimed in claim 1, wherein said gage wheel or said heel is disposed within the cultivation width of a final bottom of said bottom cultivating machine so as to be brought into contact with the wall of conglomerate.

5. The bottom cultivating machine as claimed in claim 1, wherein said gage wheel or said heel is disposed so as to be movable in conglomerate.

6. A field cultivating machine having a mast to which an upper link mounted on a tractor is secured, comprising:
  a photodetector which serves to detect a plane signal of a laser beam and is provided to a frame or a lower link of said field cultivating machine so as to be disposed within a plane which is drawn by the laser beam;
  a fulcrum member disposed at the rear end portion of the frame; and
  a cultivating function machine which is disposed at least between the mount point of said lower link and said fulcrum member, wherein a free zone is provided to said mast or said upper link or provided at a mount position of a tractor and said upper link, the mount point of said upper link being freely movable in a cultivation progress direction substantially within the free zone, the attitude of said field cultivating machine being controlled on the basis of the plane signal by the output power of a lift control mechanism of the tractor so that said photodetector is located within the plane drawn by the laser beam.

7. The field cultivating machine as claimed in claim 6, wherein said cultivating function machine has a stirring function of a rotary or a paddy harrow.

8. The field cultivating machine as claimed in claim 6, wherein said cultivating function machine comprises any one of a beam standard of a sub soiler, a ditch cutting machine and a hilling machine.

9. The field cultivating machine as claimed in claim 8, wherein said fulcrum member comprises a wheel, a roller or a warp member which is brought into contact with the surface of a field.

10. A field cultivating machine which is mounted on a tractor by a hauling system or linkage draw bar system comprising:
  a photodetector which serves to detect a plane signal of a laser beam and is provided to a frame or a lower link of said field cultivating machine so as to be disposed within a plane which is drawn by the laser beam;
  a fulcrum member disposed at the rear end portion of the frame; and
  a cultivating function machine which is disposed at least between the mount point of said lower link and said fulcrum member, wherein a free zone is provided to said mast or said upper link or provided at a mount position of a tractor and said upper link, the mount point of said upper link being freely movable in a cultivation progress direction substantially within the free zone, the attitude of said field cultivating machine being controlled on the basis of the plane signal by the output power of a lift control mechanism of the tractor so that said photodetector is located within the plane drawn by the laser beam.

11. The field cultivating machine as claimed in claim 10, wherein said cultivating function machine comprises a bottom cultivating machine.

12. The field cultivating machine as claimed in claim 10, wherein said cultivating function machine comprises a leveling machine.

13. The field cultivating machine as claimed in claim 10, wherein said cultivating function machine comprises a rake.

* * * * *